(12) United States Patent
Cai et al.

(10) Patent No.: US 11,651,375 B2
(45) Date of Patent: *May 16, 2023

(54) BELOW-THE-LINE THRESHOLDS TUNING WITH MACHINE LEARNING

(71) Applicant: ORACLE FINANCIAL SERVICES SOFTWARE LIMITED, Mumbai (IN)

(72) Inventors: Jian Cai, Forest Hills, NY (US); Sunil J. Mathew, Brooklyn, NY (US)

(73) Assignee: Oracle Financial Services Software Limited, Maharashtra (IN)

(*) Notice: Subject to any disclaimer, the term of this patent is extended or adjusted under 35 U.S.C. 154(b) by 0 days.

This patent is subject to a terminal disclaimer.

(21) Appl. No.: 17/347,940

(22) Filed: Jun. 15, 2021

(65) Prior Publication Data

US 2021/0312458 A1    Oct. 7, 2021

Related U.S. Application Data

(63) Continuation of application No. 16/145,952, filed on Sep. 28, 2018, now Pat. No. 11,055,717.

(51) Int. Cl.
*G06Q 20/40* (2012.01)
*G06N 20/00* (2019.01)
(Continued)

(52) U.S. Cl.
CPC ....... *G06Q 20/4016* (2013.01); *G06K 9/6262* (2013.01); *G06N 20/00* (2019.01); *G06Q 40/02* (2013.01)

(58) Field of Classification Search
None
See application file for complete search history.

(56) References Cited

U.S. PATENT DOCUMENTS

2011/0055072 A1* 3/2011 Lee ................. G06Q 40/08
705/38
2016/0323157 A1 11/2016 Marvasti
(Continued)

OTHER PUBLICATIONS

Patent Cooperation Treaty (PCT), International Search Report and Written Opinion issued in PCT International Application No. PCT/IB2019/001055 (PCT International Filing Date Sep. 27, 2019), dated Jan. 3, 2020 (13 pgs.).
(Continued)

*Primary Examiner* — Namrata Boveja
*Assistant Examiner* — Liz P Nguyen
(74) *Attorney, Agent, or Firm* — Kraguljac Law Group, LLC

(57) ABSTRACT

Systems, methods, and other embodiments for ML-Based automated below-the-line threshold tuning include, in one embodiment, training an ML model to predict probabilities that an event is fraudulent on a set of events (i) sampled from a set of historic events labeled by an alerting engine as either above-the-line events or below-the-line events on either side of a threshold line indicating that an event is suspicious, and (ii) confirmed to be either fraudulent or not fraudulent; determining that the alerting engine should be tuned based on differences between probability values predicted for the events by the trained machine learning model and the labels applied to the events; generating a tuned threshold value for the threshold line based at least in part on the probability values predicted by the machine learning model; and tuning the alerting engine by replacing a threshold value with the tuned threshold value to adjust the threshold line.

20 Claims, 12 Drawing Sheets

(51) Int. Cl.
 G06K 9/62 (2022.01)
 G06Q 40/02 (2023.01)

(56) References Cited

U.S. PATENT DOCUMENTS

2017/0270534 A1* 9/2017 Zoldi ................ G06Q 20/4016
2017/0318036 A1 11/2017 Movsisyan
2019/0132205 A1 5/2019 Du

OTHER PUBLICATIONS

Shijia Gao, et al.: "Intelligent Anti-Money Laundering System," Service Operations and Logistics, and Informatics, 2006 IEEE International Conference on, IEEE PI, Jun. 1, 2006 (6 pgs).
Leite Roger A, et al.: "EVA: Visual Analytics to Identify Fraudulent Events," IEEE Transactions on Visualization and Computer Graphics, IEEE Service Center, Los Alamitos, CA, US, vol. 24, No. 1, Jan. 1, 2018 (10 pgs).
Bart Baesens, Credit Risk Modeling Using SAS Course Notes (Chapter 12), Book Code E2743, pp. 1-12, Copyright 2015, SAS Institute Inc., Cary, NC, USA.
U.S. Non-Final Office Action dated Aug. 24, 2020 from U.S. Appl. No. 16/145,952, filed Sep. 28, 2018; pp. 1-21.

* cited by examiner

BELOW-THE-LINE THRESHOLDS TUNING WITH MACHINE LEARNING

CROSS REFERENCE TO RELATED APPLICATION

This disclosure is a continuation of and claims the benefit of priority to U.S. patent application Ser. No. 16/145,952, entitled "Below-The-Line Thresholds Tuning With Machine Learning," filed Sep. 28, 2018, which is incorporated herein by reference in its entirety for all purposes.

BACKGROUND

Financial institutions are subject to anti-money-laundering (AML) regulations that require them to identify and report suspicious activity. As a result, sophisticated computing systems have been developed to track and identify suspicious electronic activities by evaluating transactions against deterministic rules called scenarios. Each scenario represents a known or documented suspicious activity. Threshold values are set for various parameters of a scenario. Different threshold values may be applied to various subsets of customers with similar behavior, referred to as segments. An initial evaluation of customer activity is often performed by a computer. The computer is configured to detect an occurrence of one or more scenarios. The computer generates an alert to the financial institution when customer activity exceeds a scenario's threshold values. Anti-money-laundering regulations require the financial institution investigate each alert within a defined time frame and file a suspicious activity report (SAR) to the government.

Raising the threshold values reduces alerts and makes an alert more likely to correctly identify the transaction as suspicious. But, raising the threshold values increases the suspicious transactions that does not cause an alert. Lowering the threshold values makes the scenario more likely to generate an alert for all suspicious transactions. But, lowering the threshold values increases alerts for the financial institution to investigate, and these alerts are less likely to correctly identify the transaction as suspicious. A substantial body of regulatory guidelines dictates the methodology for setting the thresholds. Setting the threshold values too high, or in violation of the prescribed methodology exposes a financial institution to Financial Crime Compliance (FCC) risk and can result in a heavy fine. But setting the thresholds too low will generate too many alerts—mainly false positives—making it impossible for investigators to timely complete the required investigation and reporting. An optimal threshold value can be determined based on error tolerance and risk tolerance. To strike a suitable balance, financial institutions need to perform threshold tuning to determine one or more proper threshold values for each scenario and segment.

Sampling investigation is an integral part of threshold tuning. Traditionally, a financial institution's approach to threshold tuning covers (i) all visible risk—every customer activity that resulted in a suspicious activity report within a selected time frame (a tuning window) based on post-production above-the-line (ATL) analysis; and (ii) unknown risk within a tolerable level by sampling from pre-production above-the-line and below-the-line (BTL) customer activity alerts. This process is heavily manual and therefore extremely costly.

The financial institution's tolerance for risk that it will not capture suspicious activity dictates how large a volume of events is to be sampled. It is a long-existing sample volume problem that sample volume is huge when the tolerance for risk is reasonably low. This places a burden on both computing resources and human resources. The sample volume is generally so large that only the largest of financial institutions have the resources for investigators to complete the evaluation of samples. For example, in a sampling for 16 scenarios of 60 segments each from three below-the-line sets with an average sample size of 90, the total event sample is 16×3×60×90 which is 259,200 sample events for investigation. The majority of companies are unable to handle this kind of volume. Investigation and disposition of one sample event usually takes several hours, and a total event sample of this size requires hundreds of thousands of investigator man-hours to complete. This can require hiring thousands of investigators in order to complete the traditional tuning process in a reasonable time. These burdens encourage financial institutions to take statistically unsound shortcuts in tuning methodology, preventing proper implementation of threshold tuning tools and processes.

One could reduce the investigative burden by increasing the tolerance level for risk, but this is undesirable to regulators and may be prohibited. Accordingly, a method of threshold tuning that reduces the investigative burden on financial institutions is desired.

SUMMARY

In one embodiment, a computer-implemented method is presented, the method comprising: training a machine learning model to predict probabilities that an event is fraudulent on a set of events (i) sampled from a set of historic events labeled by an alerting engine as either above-the-line events or below-the-line events on either side of a threshold line indicating that an event is suspicious, and (ii) confirmed to be either fraudulent or not fraudulent; determining that the alerting engine should be tuned based on differences between probability values predicted for the events in the set of historic events by the trained machine learning model and the above- or below-the-line labels applied to the events in the set of historic events; generating a tuned threshold value for the threshold line based at least in part on the probability values predicted by the machine learning model; and tuning the alerting engine by replacing a threshold value with the tuned threshold value to adjust the threshold line to more accurately label subsequent events as not suspicious.

In one embodiment, the computer-implemented method further comprises: pooling events detected in the activity of a focal entity by scenario and segment combination applied to the focal entity; and correlating the pooled events of the focal entity with other pooled events detected by other scenario and segment combinations applied to the focal entity. In one embodiment, the computer-implemented method further comprises identifying a time period for which the pooled, correlated events are correlated. In one embodiment, the computer-implemented method further comprises deduplicating the set of sampled events such that each correlated event is unique based on a primary key. In one embodiment, the computer-implemented method further comprises labeling all the pooled, correlated events of the focal entity suspicious where any one of the pooled, correlated events of the focal entity is confirmed to be suspicious.

In one embodiment, the computer-implemented method further comprises determining that a rate of suspicious events estimated by the machine learning model in a sector of the set of events exceeds a preset tolerable rate of suspicious events for the sector, indicating that alerting engine thresholds for the sector should be tuned.

In one embodiment, the computer-implemented method further comprises automatically generating the tuned threshold value by selecting to be the tuned threshold value a parameter value of an event predicted to be suspicious by the machine learning model that is beyond the threshold value.

In one embodiment, the computer-implemented method further comprises automatically generating the tuned threshold value by selecting to be the tuned threshold value a percentile threshold value of a next percentile band that brackets a parameter value of an event predicted to be suspicious by the machine learning model that is beyond the threshold value.

In one embodiment, a non-transitory computer-readable medium storing computer-executable instructions that when executed by at least a processor of a computer cause the computer to execute the methods described herein is presented.

In one embodiment, a computing system, comprising: memory for storing at least instructions; a processor configured to at least execute the instructions from the memory; and a non-transitory computer-readable medium operably connected to the processor and storing computer-executable instructions that when executed by at least a processor cause the computing system to execute the methods described herein is presented.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
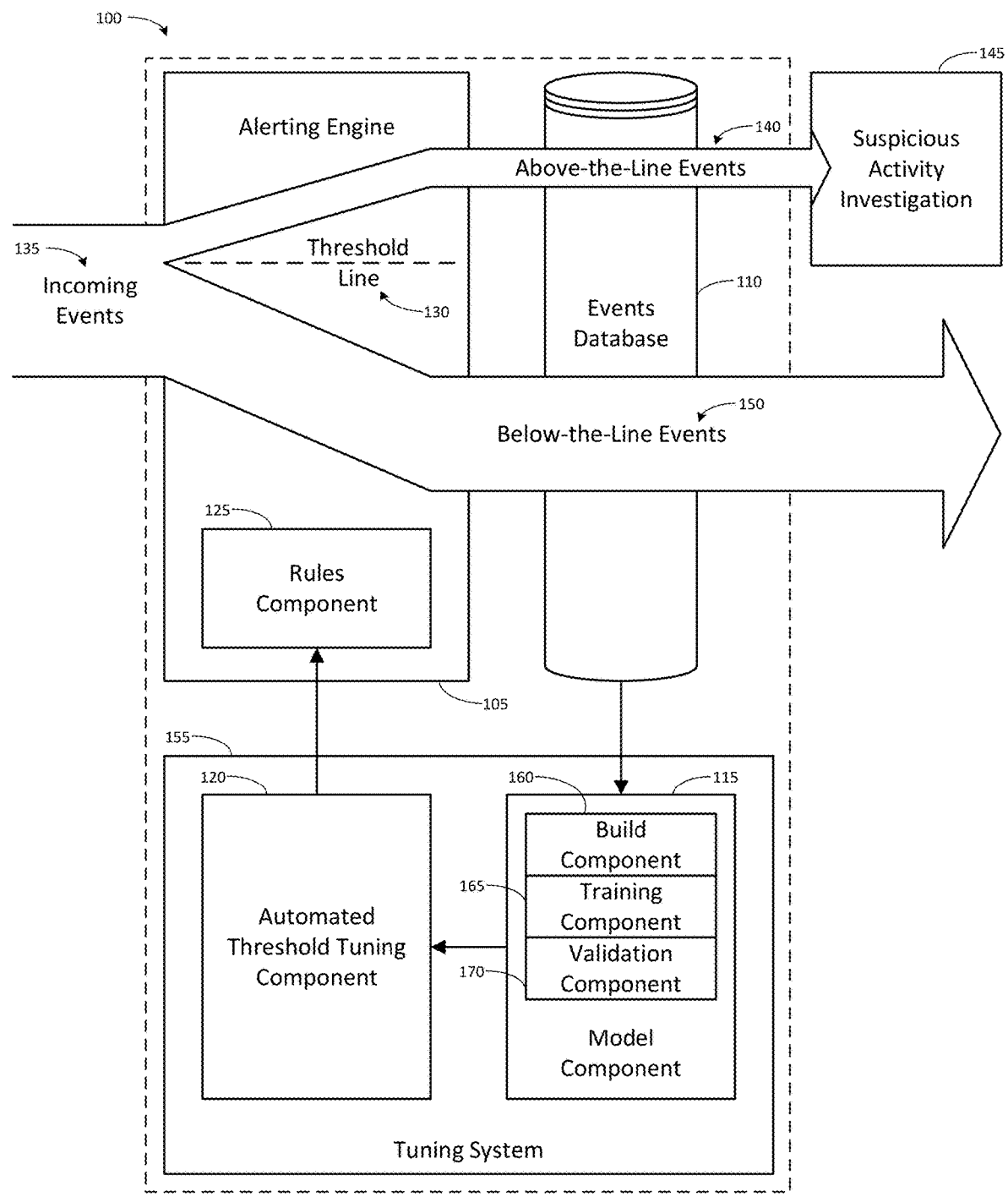
FIG. 1 illustrates one embodiment of a monitoring system that implements and applies machine learning to below-the-line threshold tuning.

Computerized systems and methods are described herein that implement technological processes for tuning a below-the-line threshold by applying machine learning. The threshold defines two categories of events that are either above-the-line or below-the-line. The threshold is defined for each scenario and segment combination of a set of one or more scenario and segment combinations (discussed in additional detail below) by a set of threshold values. An event that satisfies conditions of the threshold (or otherwise triggers the threshold) is identified as an above-the-line event, indicating that the event is likely suspicious activity. An event that does not satisfy conditions of the threshold is identified as a below-the-line event, indicating that the event is likely not suspicious activity. A tuned threshold provides improved control for a system to more accurately monitor and detect suspicious activities.

In one embodiment, a suspicious activity includes electronic transactions that may involve money laundering. The threshold values define conditions that represent and/or do not represent money laundering activities. In this approach, machine learning is applied in combination with calibrated probability of suspicious events to identify risky segments and adjust one or more of the threshold values to more accurately identify likely suspicious activity. This tuning allows the system to identify likely suspicious transactions more accurately than prior approaches and reduces transactions falsely identified as likely suspicious activity. This tuning also reduces the investigative burden (the number of test alerts) without changing the tolerance level for risk. Further, this approach solves the long existing sample volume problem, dramatically reducing the man-hours required by previous threshold tuning processes.

In one embodiment, a machine learning model for calculating a probability of suspicious event for an observation is built. The machine learning model is calibrated during training and the calibration is validated. The machine learning model is used to apply a calibrated probability of suspicious events to each observed event during a scoring process. The calibrated probabilities are in turn used to risk rate any dynamically formed segments. The calibrated probability of suspicious events can be used to determine if a scenario and segment's threshold values should be lowered.

The prior below-the-line approach and the present machine learning approach described in this specification apply different risk-based techniques in different ways. The traditional below-the-line approach controls risk by labor-intensive sampling investigation by a human investigator.

The investigators' insights are wasted if the same investigation is done over and over again.

In the present machine learning approach, risk is identified and controlled by translating a null hypothesis ($H_0$) from a sampling calculator to form the machine learning model. Rather than performing the labor-intensive sampling investigation, a minimal sampling investigation sufficient to capture the investigators' insights into the machine learning model is performed. Then, the machine learning model is used to risk rate events captured in a database (far more events than just the sample of events for the prior approach) and identify risky scenario and segment combinations. If a scenario and segment combination is risky enough to justify lowering a threshold setting, that combination's threshold values may be adjusted to reduce the risk.

Many technical considerations may be applied to make the machine learning model robust. In one embodiment, events previously labeled as above-the-line (suspicious) and below-the-line (not suspicious) are proportionally sampled across an entire population spectrum by hypergeometric sample size. In another embodiment, the events are sampled across scenarios since the events may be correlated. In another embodiment, both correlation and de-correlation of events are performed conservatively so the model will not underestimate risk. In another embodiment, the machine learning model is calibrated both in validation as well as in scoring, which allows inferring not only from the order but also from a magnitude of probability of suspicious events scores. In a further embodiment, the validation uses a $\beta$-distribution test instead of a binomial test calculated by normal distribution because the $\beta$-distribution is more assumption free. These are described in more detail with references to the figures.

Referring now to FIG. 1, one embodiment of monitoring system 100 that implements and applies machine learning to control tuning of a below-the-line threshold is shown. Monitoring system 100 is made up of components for performing one or more particular functions. Such components may be implemented for example as software modules executed at least by processor 1210. In one embodiment, monitoring system 100 includes the following components: an alerting engine 105, an events database 110, a model component 115, and a tuning component 120. Model component 115 and tuning component 120 make up a tuning system 155. Model component 115 may access the events database 110.

Alerting engine 105 includes a rules component 125. Rules component 125 is a collection of scenarios (or deterministic rules) that define certain patterns of activity to be suspicious. Each scenario is described by at least one predetermined threshold value for each of one or more parameters. The threshold values are stored in rules component 125.

The monitoring system 100 may subdivide the activities in the monitored system by segment associated with a focal entity (such as a customer or counterparty to a transaction). Segments refer to groups of focal entities with similar characteristics. The system applies the same threshold values to the activities of focal entities in the same segment. How a segment is determined varies from financial institution to financial institution. Although a scenario may apply to multiple focal entities, the scenario may have different threshold values for evaluating a focal entity's activity depending on the segments associated with that focal entity. These different threshold values for the scenario may be stored in rules component 125. For example, a scenario that detects a customer's "rapid movement of funds" behavior may have different threshold values depending on whether the customer moving the funds belongs to a "high net worth" segment or a "low net worth" segment. Threshold line 130 is a composite representation of individual parameter threshold values applied for each combination of scenario and segment stored in rules component 125.

With continued reference to FIG. 1, incoming events 135 are provided to the alerting engine 105. An event is a set of summarized transaction(s) for a focal entity. In some embodiments, an event is a daily, weekly, or monthly aggregation of all parameter values for the focal entity's transactions. In other embodiments, an event is a daily, weekly, or monthly aggregation of only those parameter values for the focal entity's transactions that are related to one or more specific scenarios. In some situations, a scenario can target a single transaction, such as screening for a blacklisted name, resulting an event set of a single transaction. Scenarios could target either daily, weekly, or monthly aggregations. The incoming events 135 may be provided to the alerting engine 105 for example in real-time, on an event-by-event basis, or in a batch. Alerting engine 105 parses each incoming event to determine parameter values for each parameter of the incoming event. The parameters of the incoming event include at least one parameter for each threshold value of multiple scenarios that the alerting engine 105 will apply to that event. Each of the incoming events 135 may also be parsed to determine segment information for the focal entity(s) associated with the event. Threshold values for the scenarios are selected from rules component 125 based on this segment information. Alerting engine 105 evaluates the parameter values against associated threshold values for the scenarios. If a threshold value is exceeded by a parameter value for the event an alert is generated.

As would be understood by one of ordinary skill in the art, a parameter value greater than, less than, equal to, not equal to, matching, or some other comparison with a threshold value may cause the scenario to be violated. Accordingly, referring to a parameter value as "exceeding" a threshold value, and the like is shorthand for "falling outside the range for the threshold value prescribed by the scenario," regardless of whether the parameter value is excessively small, excessively large, equal, unequal, or exceeding some other comparison.

Alerts are generated by the alerting engine 105 on the basis of individual scenarios. Rules component 125 often includes many different scenarios, in order to detect multiple suspicious behaviors. Alerting engine 105 may apply more than one scenario to an incoming event 135. This may cause more than one alert.

In one embodiment, events database 110 is a data structure for storing events and related information. Events database 110 may be stored for example in memory 1215, storage 1235, or data 1240.

In some embodiments, the alerting engine 105 generates the alert regarding the incoming event 135. Alerting engine 105 may then record the event in events database 110 as an above-the-line event 140. Above-the-line events 140 may receive further suspicious activity investigation 145. Alerting engine 105 may also send an electronic message or otherwise signal that the incoming event 135 has broken the rule. If no parameter threshold value is exceeded (and the rule satisfied) the alerting engine 105 records the event in events database 110 as a below-the-line event 150.

Model component 115 includes a build component 160. Build component 160 builds, trains, and validates a machine learning model for calculating the probability that an event is suspicious. The machine learning model is built, trained, and validated based on events sampled from events database 110.

Model component 115 uses the machine learning model to determine the calibrated probability that events stored in the events database 110 that are marked as below-the-line events 150 (not suspicious) are actually suspicious activity. If, in error, a below-the-line event 150 is actually suspicious activity, then that event should have been marked as an above-the-line event 140. In this case, threshold line 130 may need adjustment. Model component 115 determines which parameter threshold value of rules component 125 should be adjusted, as described in further detail with reference to FIG. 9. Model component 115 may further determine an adjustment value for the parameter threshold to cause the alerting engine 105 to correctly identify the event as suspicious activity. Model component 115 generates a tuned parameter threshold value based on the adjustment value.

The tuned parameter threshold value is provided by the model component 115 to the tuning component 120 or retrieved by the tuning component 120 from the model component 115. The tuning component 120 replaces an existing parameter threshold value in the rules component 125 with the tuned parameter threshold value, thereby tuning the alerting engine 105 with an adjusted threshold line 130. The accuracy of the alerting engine 105 is thus increased, as the system will now correctly identify additional events as suspicious activity (above-the-line events 140) that previously would have been identified as non-suspicious activities (below-the-line events 150).

—Example Embodiment—

Figure 2:
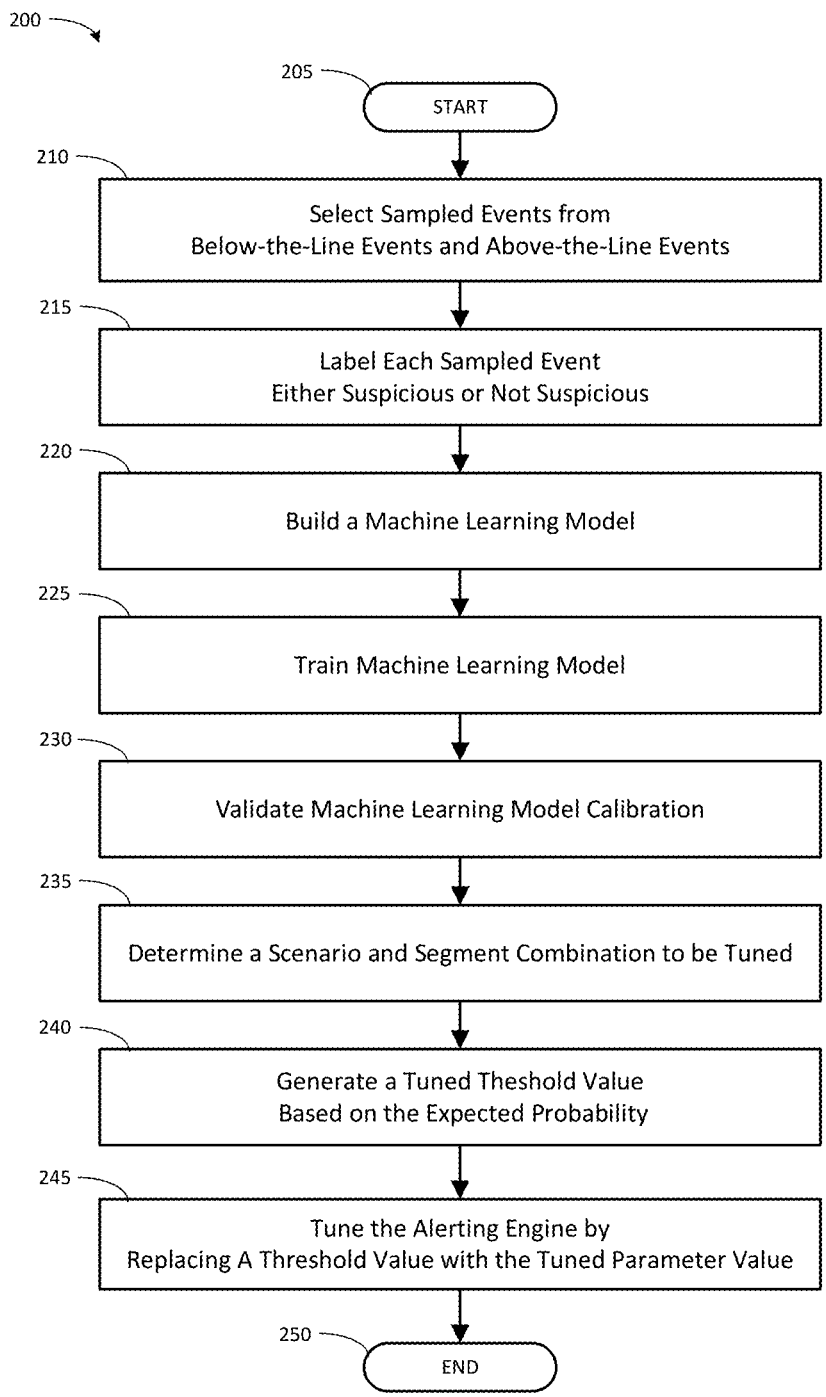
FIG. 2 illustrates an embodiment of a computer-implemented method associated with applying machine learning to below-the-line threshold tuning.

FIG. 2 shows an embodiment of a computer-implemented method 200 associated with applying machine learning to adjust and tune a below-the-line threshold. In one embodiment, a computing device (such as computer 1205, shown in FIG. 12) is implemented with an executable algorithm that is configured to perform the method 200 or any other disclosed method herein. For example, method 200 may be performed by tuning system 155 of FIG. 1 using various computing resources of the computer 1205 (shown in FIG. 12), such as a hardware processor 1210 for executing instructions, memory 1215 and/or storage 1235 for storing data, and/or network hardware for transmitting data to remote computers over networks.

The method 200 may be initiated based on various triggers, such as receiving a signal (or parsing stored data) indicating (i) that an event previously indicated to be below-the-line is actually suspicious activity, (ii) that no machine learning model has been built to calculate for a given event a probability that the given event is suspicious, (iii) that a re-validation of an existing machine learning model has failed, (iv) that a user has initiated method 200, or (v) that method 200 is scheduled to be initiated at defined times or time intervals.

The method 200 initiates at start block 205 and processing continues to process block 210. At process block 210, processor 1210 selects a set of sampled events from a set of historic events. The set of historic events was previously divided by alerting engine 105 into a set of below-the-line events and a set of above-the-line events. These two sets are separated by a threshold line indicating that an event is likely suspicious or not suspicious as previously explained. The threshold line is defined at least in part by one or more threshold values.

In one embodiment, the set of historic events is a set of events previously evaluated by alerting engine 105 and retrieved from events database 110. The set of historic events is stored in events database 110 and the processor 1210 uses a hypergeometric sampling calculator to select a set of sampled events from the historic events. For example, the processor 1210 selects the set of sampled events from both the set of below-the-line events and the set of above-the-line events. In one embodiment, processor 1210 may store the set of sampled events in events database 110. Upon completion of the selection of the set of sampled events, processor 1210 sends a message or stores data indicating that the selection of the set of sampled events is complete. Process block 210 completes and processing continues at process block 215. Further embodiments of the selecting are discussed elsewhere in this document, for example in the section entitled "Below-the-Line Phase 1—Quick Check," and with reference to method 300 and FIGS. 3A and 3B.

At process block 215, processor 1210 labels each event in the set of sampled events as either suspicious or not suspicious. In one embodiment, the labelling includes one or more of the following steps. The processor 1210 parses the message or data indicating that the set of sampled events is complete to determine whether or not to begin process block 215. Processor 1210 retrieves each event in the set of sampled events from events database 110. Processor 1210 labels the event by creating or editing a value of a field in events database 110 associated with the event. The value of the field indicates to the processor 1210 that the event is either suspicious or not suspicious. Upon completion of labeling, processor 1210 sends a message or stores data indicating that labeling is complete. Process block 215 completes and processing continues at process block 220. Further embodiments of the labeling are discussed elsewhere in this document, for example in the section entitled "Below-the-Line Phase 2—Labeled Data Gathering," and with reference to method 500 and FIG. 5.

At process block 220, processor 1210 builds a machine learning model to calculate for a given event a probability that the given event is suspicious. This calculation is based at least in part on the set of sampled events. In one embodiment, the building includes one or more of the following steps. Processor 1210 parses the message or data indicating that labeling is complete to determine whether or not to begin process block 220. Processor 1210 executes build component 160 to build the machine learning model. The machine learning model, when completed, becomes a part of model component 115. Processor 1210 stores the machine learning model as a data structure, for example, in memory 1215, storage 1235, or data 1240. Upon completion of the machine learning model, processor 1210 sends a message or stores data indicating that the machine learning model has been built. Process block 220 completes and processing continues at process block 225. Further embodiments of the building of the machine learning model are discussed elsewhere in this document, for example in the section entitled "Building a Machine Learning Model."

At process block 225, processor 1210 trains the machine learning model. In one embodiment, the training includes one or more of the following steps. Processor 1210 parses the message or data indicating that the machine learning model has been built to determine whether or not to begin process block 225. Processor 1210 executes training component 165 to train the machine learning model. Processor 1210 stores training information as a data structure associated with the machine learning model. Upon completion of the training, processor 1210 sends a message or stores data indicating that the training has been completed. Block 225 then completes and processing continues at process block 230. Further embodiments of the training of the machine learning model are discussed elsewhere in this document, for example in the section entitled "Training the Machine Learning Model" and with reference to method 600 and FIG. 6.

At process block 230, processor 1210 validates that the machine learning model is calibrated. In one embodiment, the validating includes one or more of the following steps. Processor 1210 parses the message or data indicating that the training has been completed to determine whether or not to begin process block 230. Processor 1210 executes validation component 170 to validate the calibration of the machine learning model. Where the validation completes successfully, processor 1210 sends a message or stores data indicating the success of the validation. Where the validation does not complete successfully, processor 1210 sends a message or stores data indicating the failure of the validation. Process block 230 then completes and processing continues at process block 235. Further embodiments of the validating of the machine learning model are discussed elsewhere in this document, for example in the section entitled "Validating the Machine Learning Model" and with reference to method 700 and FIG. 7.

Thus, in one embodiment, a machine learning model is built and trained (and the trained model validated) to predict probabilities that an event is fraudulent on a set of events that are both (i) sampled from a set of historic events labeled by an alerting engine as either above-the-line events or below-the-line events on either side of a threshold line indicating that an event is suspicious, and (ii) confirmed to be either fraudulent or not fraudulent.

At process block 235, processor 1210 determines a scenario and segment combination to be tuned. This determination is based at least in part on one or more probabilities calculated by the machine learning model. In one embodiment, the determining includes one or more of the following steps. Processor 1210 parses the message or data created at process block 230 to determine that the validation completed successfully. If validation did not complete successfully, processing at process block 235 will not proceed. If validation did complete successfully, processing at process block 235 will proceed. Processor 1210 executes model component 115 to calculate the one or more probabilities. Processor 1210 associates the one or more probabilities with events belonging to the set of historic events. Processor 1210 may associate one of the one or more probabilities with an event by creating or editing a value of a field in events database 110 associated with the event. The value of the field indicates to the processor 1210 a probability that the event is suspicious. Processor 1210 sends a message or stores data indicating the scenario and segment combination to be tuned. Process block 235 then completes and processing continues at process block 240. Thus, in one embodiment, the processor determines that the alerting engine should be tuned based on differences between probability values predicted for the events in the set of historic events by the trained machine learning model and the above- or below-the-line labels applied to the events in the set of historic events. Further embodiments of the determining are discussed elsewhere in this document, for example in the section entitled "Identify Scenario and Segment for Tuning" and with reference to method 900 and FIG. 9.

At process block 240, processor 1210 generates a tuned parameter value. This generation is based at least in part on the one or more probabilities calculated by the machine learning model. In one embodiment, the determining includes one or more of the following steps. Processor 1210 parses the message or data indicating the scenario and segment to be tuned to determine whether or not to begin process block 240. Processor 1210 executes tuning component 120 to parse the message or data to identify the scenario and segment combination to be tuned. Processor 1210 examines the scenario and segment combination to be tuned to determine an adjustment to one or more threshold values for the scenario and segment combination which would have caused that scenario and segment combination to determine the event to be suspicious. Processor 1210 generates the tuned threshold value based on the adjustment. Processor 1210 sends a message or stores data indicating the tuned threshold value and the scenario and segment combination to be tuned. Process block 240 then completes and processing continues at process block 245. Thus, in one embodiment, a tuned threshold value for the threshold line is generated based at least in part on the probability values predicted by the machine learning model. Further embodiments of the generating of the tuned threshold value are discussed elsewhere in this document, for example in the section entitled "Parameter Generation and Tuning the Alerting Engine."

At process block 245, processor 1210 tunes the alerting engine by replacing at least one of the one or more threshold values with the tuned threshold value. This causes the threshold line to be adjusted to reduce errors by the alerting engine in classifying events as not suspicious. In one embodiment, the determining includes one or more of the following steps. Processor 1210 executes tuning component 120 executes tuning component 120 to parse the message or data indicating the tuned threshold value and the scenario and segment to be tuned to identify which one of the one or more threshold values to replace in rules component 125. Processor 1210 replaces an existing threshold value in the rules component 125, for example by directly overwriting the existing threshold value with the tuned threshold value, or by storing the tuned threshold value in a storage location that will subsequently be used to replace the existing threshold value, such as by batch upload. Process block 245 completes and processing continues to end block 250, where method 200 ends. Thus, in one embodiment, the alerting engine is tuned by replacing a threshold value with the tuned threshold value to adjust the threshold line—causing the tuning engine to more accurately label subsequent events as not suspicious. This resulting increased accuracy is an improvement over alerting engines that do not implement systems and methods described herein. Further embodiments of the tuning of the alerting engine are discussed elsewhere in this document, for example in the section entitled "Parameter Generation and Tuning the Alerting Engine."

Each of the foregoing process blocks of method 200 is described in further detail below.

—Below-the-Line Phase 1—Quick Check—

A hypothetically perfect alerting engine should never determine an event to be below-the-line if the event is actually suspicious, fraudulent activity. Threshold tuning is needed when alerting engine 105 has determined that an event is a below-the-line event 150 but the event is actually suspicious activity. Accordingly, a preliminary "quick check" test may be performed to confirm that no event that the alerting engine 105 determined to be below-the-line is actually suspicious activity. This quick check test may be performed against a sampling of events from the below-the-line events 150.

In one embodiment, the quick check test could be expressed as "is there any suspicious event in the sampling of below-the-line events?" If the answer is no, then threshold tuning is not necessary, and there is no need to proceed further. If the answer is yes, then threshold tuning should be performed, and a more granular analysis to determine the threshold tuning should proceed.

In one embodiment, a null hypothesis ($H_0$) for the quick check test is that the observed rate of suspicious activity ($P_o$) in the below-the-line events 150 is zero ($H_0: P_o=0$). The null hypothesis indicates that there is no need for threshold tuning. An alternative hypothesis ($H_A$) of the "quick check" test is that the observed rate of suspicious activity ($P_o$) is greater than zero ($H_A: P_o>0$). The alternative hypothesis indicates that threshold tuning should be performed.

Figure 3A:
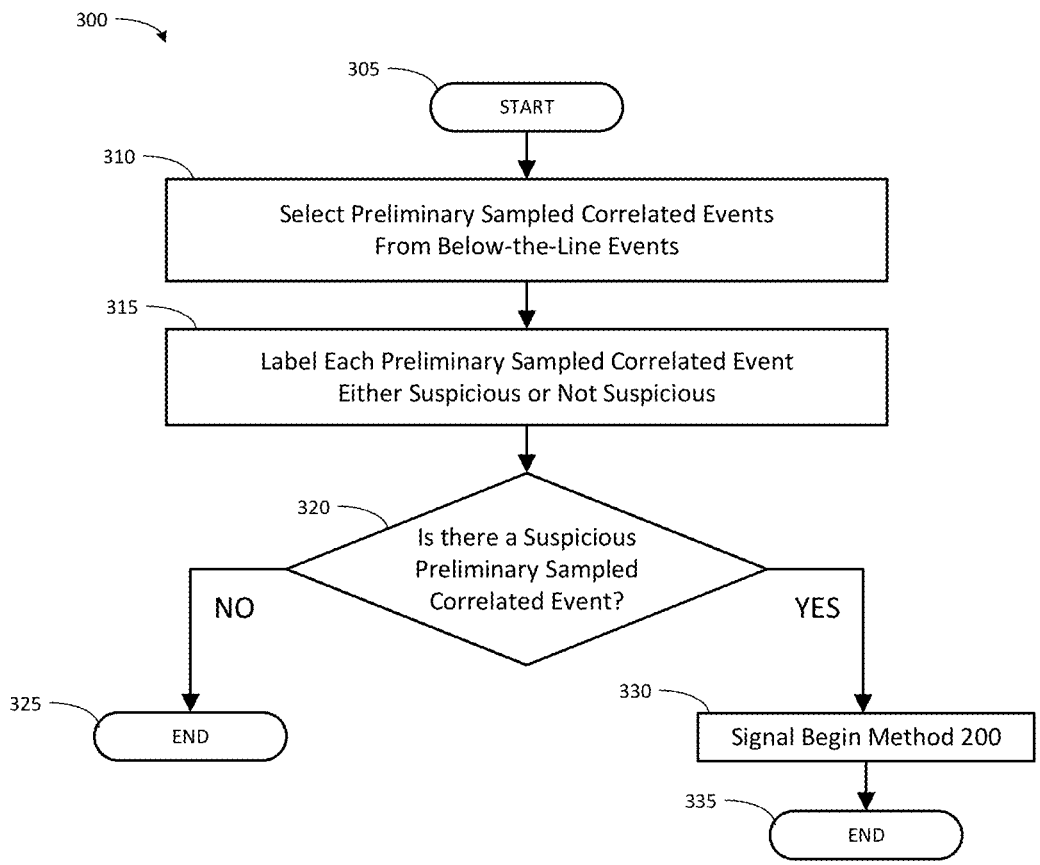
FIG. 3A illustrates one embodiment of a method associated with determining when to initiate threshold tuning.

FIG. 3A shows one embodiment of a preliminary method 300 associated with determining when to initiate threshold tuning. The preliminary method 300 is caused to begin based on various triggers, such as receiving a signal indicating that the method 300 should begin, for example received from (i) a parent method (such as method 200), (ii) a user input to the monitoring system 100 or of the tuning system 155, or (iii) that method 300 is scheduled to be initiated at defined times or time intervals.

Method 300 begins at start block 305 and proceeds to process block 310. At process block 310, the processor 1210 selects a preliminary set of sampled events from a set of below-the-line events. In some embodiments, a hypergeometric sampling calculator is used to select the preliminary set. Processing continues at process block 315.

In some embodiments, the set of below-the-line events are the below-the-line events 150 included in a set of historic (previously evaluated by alerting engine 105) events drawn from events database 110. The set of historic events may be the events in events database 110 that were evaluated by alerting engine 105 and/or stored in events database 110 within a specified timeframe or "tuning window". The tuning window is often selected to immediately precede the present, so as to include only events most similar to current customer activity. In the anti-money-laundering context, a tuning window of one year prior to the present is appropriate in order to account for seasonal variations in customer financial activity. Other tuning windows may be selected as appropriate.

The set of historic events can be very large. For example, in the anti-money-laundering context a year's worth of transactions for a financial institution can easily number in the hundreds of millions. For the very largest of banks, even a single day's worth of transactions can number in the hundreds of millions. Collecting the transactions into events on a daily, weekly, or monthly basis will still result in many millions of events in the set of historic events.

At process block 315, each event in the preliminary set of sampled events is investigated to determine whether or not the event is suspicious activity. The event is then labeled by processor 1210 to indicate that the event is either suspicious or not suspicious in accordance with the determination. Processing continues at decision block 320.

At decision block 320, the processor 1210 determines whether any event in the preliminary set is suspicious activity, based on the applied label. This is an evaluation of whether or not the null hypothesis ($H_0$) is violated or as expressed in decision block 320, a test for the alternative hypothesis ($H_A$). If no event is labeled suspicious, no suspicious activity has been detected in the below-the-line events, and the alerting engine 105 appears to be operating correctly. The process then completes at end block 325.

If there is an event labeled suspicious, suspicious activity has been detected in the below-the-line events, where there should be none. This indicates that threshold tuning is needed, and processing continues at process block 330.

At process block 330 the processor 1210 determines that method 200 should begin and generate the signal to initiate the method 200. In one embodiment, this determination may be based in part on whether there is a pre-existing ML model in the system and whether that model is still valid. An existing model can be re-used for scoring until the annual validation indicates the model is no longer valid. The signaling may occur internally in computer 1205, or be accomplished through the I/O interfaces 1245 and/or the input/output ports 1220 and may take the form of an electronic message. This signal can be used to trigger method 200 to begin. Processing then completes at end block 335.

Below-the-line events which are immediately below-the-line (having parameter values just short of the threshold values that will cause alerting engine 105 to label them suspicious activity) are more likely to be, in actuality, suspicious activity than those below-the-line events which are significantly below-the-line. Additional scrutiny of these events falling just below the threshold may then be desirable. In one embodiment, the below-the-line events may be divided into threshold sets of varying width to allow sampling of events (such as at process block 310 of FIG. 3A) to be more or less intensive for different threshold sets.

Figure 3B:
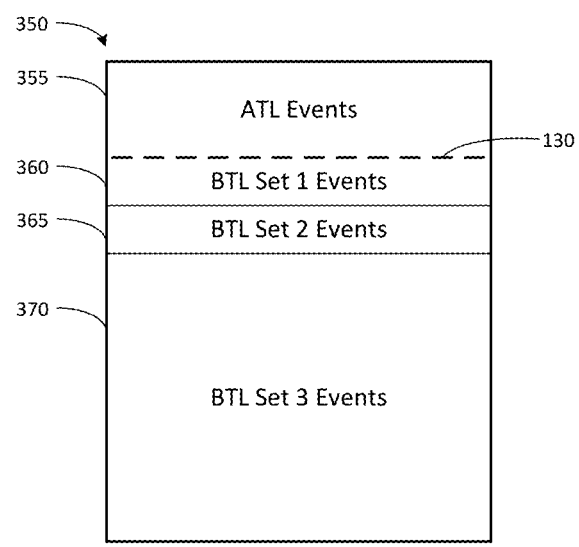
FIG. 3B illustrates an example set of historic events separated into sets covering a range of percentiles.

FIG. 3B shows an example set of historic events 350 separated into sets covering a range of percentiles. Above-the-line events 140 make up the top threshold set 355, above threshold line 130. For example, threshold line 130 may be set at the $80^{th}$ percentile so that above-the-line events 140 are the top 20 percent of events. Below-the-line events 150 make up the remainder of the events and fall below threshold line 130. Threshold set 360 includes events with parameter values falling just short of threshold line 130. In one embodiment, the below-the-line events 150 are separated into threshold sets. For example, threshold set 360 may represent the first five percentile of events that are below the threshold line 130. The floor of threshold set 360 is set at the $75^{th}$ percentile of parameter values. Threshold set 365 may then include the next five percentile of events below the threshold line 130. The floor of threshold set 365 may be set at the $70^{th}$ percentile of parameter values. Finally, threshold set 370 includes the remaining events of the example set of historic events 350.

In some embodiments where the below-the-line events 150 are separated by threshold set, a sampling of events (such as at process block 310 of FIG. 3A or at process block 210 of FIG. 2) is drawn from each threshold set to form a composite sample. For example, if the below-the-line events 150 are separated as shown and described with reference to FIG. 3B, a sample is drawn from each threshold set 360, 365 and 370. The risk tolerance of the sampling calculator that selects the events may be set differently for each threshold set. In one embodiment, the risk tolerance is set lowest, for example at 0.005, for the events falling within threshold set 360, because the events in that band are most suspect. A more permissive risk tolerance, for example of 0.01, may be used in selecting events that fall within threshold set 365, as they are slightly less suspect. Finally, a still more permissive risk tolerance, for example of 0.03 is applied in selecting events from the events that fall within threshold set 370, as they are least suspect. Because sampling with a low risk tolerance results in a higher sample volume, events falling within sets sampled with a low risk tolerance are more heavily represented in the composite sample than events falling within sets sampled with a higher risk tolerance.

Configuring the threshold sets as shown and described with reference to FIG. 3B, and sampling with increasing risk tolerance from the events falling within threshold sets 360, 365 and 370 focuses the sampling on to the most suspect populations of below-the-line events, namely, events with parameter values just short of the threshold that would cause them to be labeled suspicious. The boundaries of the threshold sets may be set at different levels, and different numbers of threshold sets may also be used, but satisfactory results have been achieved using the exemplary values described herein.

It is a characteristic of the hypergeometric sampling calculator that as population size N increases, the sample size n will approach a maximum of approximately 600 even when the tolerance for error is set at an extremely conservative level such as 0.005. Therefore, when taking a sample to determine if there is suspicious activity in the below-the-line events (such as at process block 310 of FIG. 3A) the sample size is limited to only approximately 600 events per below-the-line set sampled that are to be investigated and labeled. For example, when the below-the-line events are divided into the 3 threshold sets 360, 365, and 370, the sample size is limited to approximately 1800 events (600 events×3 below-the-line sets).

In some embodiments, the events are pooled and further correlated, and de-duplicated (as described below) prior to sampling. The correlation and de-duplication make the quick check very conservative.

—Pooling, Correlating, and Deduplicating Events—

An activity of a single focal entity can cause an alert on zero to many scenarios. Alerting engine 105 may store each of these alerts in events database 110 individually. Thus, the activities of a single focal entity across multiple incoming events 135 can result in many alerts. Each of the alerts is stored based on the combination of scenario and segment and appears separately from the other events and alerts of the focal entity in the set of historic events.

In some embodiments, processor 1210 will pool together each event in the set of historic events by scenario (and in some cases, by segment as well) applied to a focal entity. This creates a set of pooled events. Processor 1210 may further correlate each event in the set of pooled events across multiple scenarios (and sometimes by segments) by each focal entity. This creates a set of correlated events. Correlating the pooled events combines together scenario and event information for each focal entity. This correlation allows for cross-scenario (holistic) evaluation of the focal entity's behavior. Thus, in one embodiment, the processor 1210 automatically pools events detected in the activity of a focal entity by scenario and segment combination applied to the focal entity; and further automatically correlates the pooled events of the focal entity with other pooled events detected by other scenario and segment combinations applied to the focal entity.

Figure 4A:
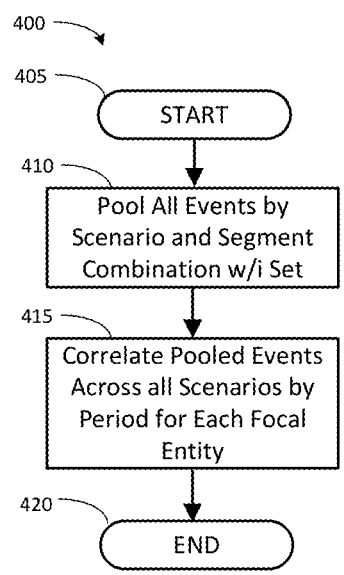
FIG. 4A illustrates one embodiment of a computer-implemented method associated with pooling and correlating events.

Referring now to FIG. 4A, an embodiment of a computer-implemented method 400 associated with pooling and correlating events is shown. In some embodiments, method 400 may be performed as a pre-processing method prior to the selecting of events 210 of method 200, or prior to selecting of preliminary events 310 of preliminary method 300. The method 400 is initiated based on various triggers, such as receiving a signal indicating that the method 400 should begin. This signal, for example, may be received from (i) a system implementing a method (such as method 200), (ii) a user input to the monitoring system 100 or of the tuning system 155, or (iii) that method 400 is scheduled to be initiated at defined times or time intervals.

In method 400, processing begins at the start block 405, and proceeds to process block 410. At process block 410, the processor 1210 pools together each event in the set of historic events by scenario applied to a focal entity. For each scenario applied to a focal entity, it is recorded whether or not any activity (event) of the focal entity caused an alert (was determined to be suspicious) under that scenario. Multiple suspicious events under a single scenario by a focal entity are therefore reduced to a single record.

This may be represented as rows in a table such as that shown in the exemplary Table 1 below. In Table 1, each focal entity is assumed to be in the same segment, and therefore has the same scenarios 1 through m applied to it. For example, if a focal entity belongs to a segment where 10 scenarios are run against each event of the focal entity, there will be 10 rows for each focal entity belonging to that segment, each row for a different scenario. Alternatively, the focal entities may belong to differing segments and may have a different series of scenarios applied to them. In this case, each focal entity will have a number of rows equal to the number of scenarios applied in its segment. In scenarios where a focal entity's activities caused one or more alerts (one or more events was determined to be suspicious), the fact that an alert occurred is recorded. This is shown for example at row 3 and row 13 in in the rightmost column of table 1. In scenarios where a focal entity's activities have caused no alerts (no events were determined to be suspicious), the fact that no alert occurred is recorded.

TABLE 1

| | Pooled Events | | |
|---|---|---|---|
| 1 | Focal Entity 1 | Scenario 1 | No Alert |
| 2 | Focal Entity 1 | Scenario 2 | No Alert |
| 3 | Focal Entity 1 | Scenario 3 | Alert |
| 4 | . . . | . . . | . . . |
| 5 | Focal Entity 1 | Scenario m | No Alert |
| 6 | Focal Entity 2 | Scenario 1 | No Alert |
| 7 | Focal Entity 2 | Scenario 2 | No Alert |
| 8 | Focal Entity 2 | Scenario 3 | No Alert |
| 9 | . . . | . . . | . . . |
| 10 | Focal Entity 2 | Scenario m | No Alert |
| 11 | . . . | . . . | . . . |
| 12 | Focal Entity 3 | Scenario 1 | No Alert |
| 13 | Focal Entity 3 | Scenario 2 | Alert |
| 14 | Focal Entity 3 | Scenario 3 | No Alert |
| 15 | . . . | . . . | . . . |
| 16 | Focal Entity n | Scenario m | No Alert |

In some embodiments, the pooling may be further divided by time period within the tuning window of the set of historic events. For example, for a set of historic events having a tuning window of one year, processor 1210 may divide the pooled events by month, week, or other time period as appropriate. In such a case, the number of rows in Table 1 would be multiplied by the number of subdivisions for time period, and an entry of alert or no alert made on a period-by-period basis. For example, where the pooled events of table 1 are further subdivided by month, there would be (i) an additional column for month, and (ii) m times 12 rows for each focal entity with alert or no alert recorded for each scenario 1 through m for every month.

Once the processor 1210 has pooled together each event in the set of historic events by scenario associated with the focal entity of that event, processing at process block 410 completes and processing continues at process block 415.

At process block 415, the processor 1210 correlates events in the set of pooled historic events across multiple scenarios by focal entity. In one embodiment, the correlation is of all events in the set of pooled historic events and is performed across all scenarios by focal entity. This creates a set of correlated events. Correlation of the pooled events may be represented as a pivot of the tall table Table 1—Pooled Events into a flat table with rows of correlated events, such as the table shown at exemplary Table 2 below.

TABLE 2

Correlated Events

| | Foc. Ent. | Scn. 1 Alert? | Scn. 2 Alert? | Scn. 3 Alert? | ... | Scn. m Alert? | Max. Disp. |
|---|---|---|---|---|---|---|---|
| 1 | Foc. Ent. 1 | No Alert | No Alert | Alert | ... | No Alert | Not Susp. |
| 2 | Foc. Ent. 2 | No Alert | No Alert | No Alert | ... | No Alert | Not Susp. |
| 3 | Foc. Ent. 3 | No Alert | Alert | No Alert | ... | No Alert | Suspicious |
| 4 | ... | ... | ... | ... | ... | ... | ... |
| 5 | Foc. Ent. n | No Alert | No Alert | No Alert | ... | No Alert | Not Susp. |

In some embodiments, the correlation may be further divided by time period within the tuning window of the set of historic events. Here, the correlated event may include information that identifies the period for which the events are correlated. This could be shown in the Correlated Events table by including a "period" column. The number of correlated events (and therefore the number of rows in the Correlated Events table) would be multiplied by the number of subdivisions for time period, with one correlated event for each period per focal entity. For example, where the correlated events span a year and are further subdivided by month, there would be n times 12 correlated events for each focal entity. Where the correlation is further divided by time period, the combination of focal entity and period form the primary key for the correlated events. Thus, in one embodiment, processor 1210 may automatically identify a time period for which the pooled, correlated events are correlated. In some embodiments, the Correlated Events table may also include a "segment" column which identifies the segment to which each focal entity belongs.

In some embodiments, the Correlated Events table may also include parameter value columns for each scenario, with a parameter value column for each parameter of the scenario. These parameter value columns are configured to hold a percentile ranking of the focal entity's parameter value(s) for the focal entity's scenario and segment against the other focal entities for that same scenario and segment. Multiple events for a focal entity in the same scenario and segment come from different time periods. For example, where the time period is a month, a focal entity's 12 rows for the one year tuning window are pooled together along with all other focal entities' 12 rows, to compute the threshold sets for the entire segment and scenario. For each parameter, percentile ranking is calculated against this pooled data. Therefore, the 12 rows for the same focal entity can have different percentile ranking for each parameter. Alternatively, the raw data from which the percentile ranking for that parameter value is calculated could be used in place of the percentile ranking.

As the focal entities may belong to differing segments and have a different series of scenarios applied to them, the rows may be of various lengths in order to accommodate the full set of scenarios (1 through m) applicable in a given segment (m can vary from segment to segment). Also, as discussed above each scenario may have differing quantities and types of parameters (parameters 1 through p, p may vary from scenario to scenario). Further, different threshold values may be applied to these parameters on a segment by segment basis. So, each correlated event can be expressed in a row of the following format:

focal_entity, time_period, segment, scenario_1, cause_sar_1, parameter_1_pct, parameter_2_pct, . . . , parameter_p_pct, scenario_2, cause_sar_2, parameter_1_pct, parameter_2_pct, . . . , parameter_p_pct, . . . , scenario_m, cause_sar_1, parameter_1_pct, parameter_2_pct, . . . , parameter_p_pct, . . . , max_disposition.

The field "focal_entity" refers to the focal entity with which the correlated events are associated. The field "time_period" refers to the time period within which the events occurred. The field "segment" refers to the segment to which the focal entity belongs. The columns beginning "scenario_" followed by a number refer to the scenarios applied to each event in the correlated event. The columns beginning "cause_sar_" followed by a number refer to whether for the scenario of the same number, the event was determined after investigation to require that a suspicious activity report be filed. The columns "parameter_[number]_pct" refer to percentile values of various scenario parameters found for an event. Alternatively, this field may refer to actual values of the various scenario parameters found for an event.

The final field "max_disposition" refers to the maximum investigator disposition applied to scenarios in the correlated event. During suspicious activity investigation 145 the investigator focuses on the alerted scenario but also gathers other related information on the focal entity in order to determine how suspicious the event is. The investigator makes a determination of a rating of the level of suspiciousness and accordingly labels each event. In some embodiments, the only two ratings are "suspicious" and "not suspicious," but other non-binary rating systems may be useful.

In some embodiments, the processor 1210 may label an event with the investigator's disposition of either suspicious or not suspicious. But, when the events are pooled and correlated as described herein one correlated event actually represents X events, X being the total number of scenarios applied to the focal entity. A maximum investigator disposition of the events in the correlated event is applied to the entire correlated event. Thus, where an event triggers an alert under any scenario and is determined to be suspicious (for example, confirmed to be fraudulent or otherwise impermissible by law or regulation), the parameter values of that event are deemed suspicious for the other scenarios. In this way, processor 1210 may automatically label all the pooled, correlated events of the focal entity suspicious where any one of the pooled, correlated events of the focal entity is confirmed to be suspicious.

For example, if after investigation of the alerted events in the correlated event no event was found to be suspicious under any scenario, the maximum disposition of the correlated event is "not suspicious." In an alternative example, if after investigation of the alerted events in the correlated event, an event was found to be suspicious under one or more scenarios, the maximum disposition of the correlated event is "suspicious," regardless of whether each individual event is suspicious under any scenario. Therefore, the correlated event is more likely to receive a higher level of event disposition compared to any of its individual component events. This use of maximum disposition on a correlated event makes evaluation of events more conservative than evaluation of simple pooled events.

This approach is conservative. Consider an example where there are five scenarios applied to a focal entity, the activity of the focal entity caused alerts on three scenarios, and after investigation one of alerted scenarios is suspicious. When observing this activity at the scenario-event level only one out of the five scenario-events of the focal entity is suspicious. But when observing this activity at the correlated event and cross-scenario level, one out of one correlated events (containing the five individual scenario-events) is suspicious.

Once the processor 1210 has correlated each event in the set of pooled historic events across multiple scenarios by focal entity, processing at process block 415 completes and processing continues to end block 420, where processing completes.

Sampling from only the above-the-line population to build a model may result in a biased sample. Further, regulations may require that the entire below-the-line population be sampled. Accordingly, in some embodiments where the set of historic events is divided by threshold set, the pooling and correlating may be performed by processor 1210 separately for the set of above-the-line events 140 and the one or more sets of below-the-line events 150. In these embodiments, the processor 1210 repeats the pooling process for each set of of above-the-line events 140 and below-the-line events 150, with each set of events being substituted in turn for the full set of historic events. This results in a set of pooled events for each set. In one embodiment, the sets of below-the-line events 150 are a first set of below the line events falling within threshold set 360, a second set of below the line events falling within threshold set 365, and a third set of below the line events falling within threshold set 370. Pooling the events with a pool for each set of events allows the machine learning model to be built from an un-biased sample. Further, because the sets of below the line events are risk-based, sampling may select more heavily from the riskier sets (those closer to the threshold line).

The threshold line may be located at a different percentile for two different scenarios. For example, the boundary percentiles of the first set of below the line events (the boundaries of threshold set 360) may be different for the two scenarios. When the events are pooled, events belonging to the same set (such as events belonging to the first set of below-the-line events) are pooled together. Further, the aggregate percentile value of the event is determined based on the boolean operators that connect the parameters of the scenario. Where a scenario connects two parameters are connected by an AND condition, then the lower percentile value is selected. Where the two parameters are connected by an OR condition, the higher percentile value is selected). These rules for aggregation are are referred to herein as the "AND OR rule."

Figure 4B:
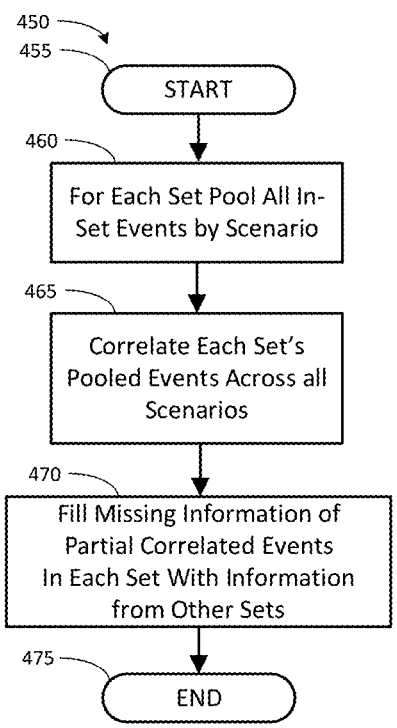
FIG. 4B illustrates one embodiment of a computer-implemented method associated with pooling and correlating events within threshold sets.

Referring now to FIG. 4B, an embodiment of a computer-implemented method 450 associated with pooling and correlating events within threshold sets, and further deduplicating the pooled and correlated events across sets is shown. In some embodiments, method 450 may be performed as a preprocessing method in a similar fashion to method 400 and may be initiated in similar ways to method 400.

In method 450, processing begins at start block 455 and proceeds to process block 460. At process block 460, the processor 1210 pools together each event in a set of events falling within a threshold set of events in the set of historic events by the pooling process described above. The processor 1210 repeats this pooling for the set of events falling within each threshold set of events in the set of historic events, producing a set of pooled events for each threshold set. For example, if the events are divided as described with reference to FIG. 3B, the operation of the processor 1210 in process block 760 will produce a set of pooled events for each of threshold sets 355, 360, 365, and 370. Once the processor 1210 has pooled together each event in each threshold set by scenario associated with the focal entity of that event, thereby creating a set of pooled events for each threshold set, processing at process block 460 completes. Processing continues at process block 465.

At process block 465, the processor 1210 correlates the events of a set of pooled events for a threshold set according to the correlation process described above. The processor 1210 repeats this correlation for each threshold set of events. This produces for each threshold set a set of correlated events that are correlated across multiple scenarios by focal entity. For example, if the events are divided as shown and described above with reference to FIG. 3B, the operation of the processor 1210 in process block 765 will produce a set of correlated events for each of threshold sets 355, 360, 365, and 370. Once the processor 1210 has correlated the pooled events across multiple scenarios by focal entity for each threshold set, thereby creating a set of correlated events for each threshold set, processing at process block 465 completes. Processing continues at process block 470.

At process block 470, the processor 1210 completes missing information within the correlated events of a threshold set with information from the correlated events of the other threshold sets. A correlated event of one threshold set may have the same primary key as a correlated event of another threshold set but the events themselves may differ. For example, one of the correlated events may be labeled suspicious in one set but may not be labeled suspicious in another set, or one of the correlated events may include a scenario that is not included in the other. These events are therefore only partially correlated, and should be correlated across the threshold sets. The data from the duplicate entries should be collapsed into a single entry to ensure complete visibility across the behavior of a focal entity. The processor 1210 searches for duplicate primary keys across each set of correlated events for each threshold set. For example, in a first below-the-line set, primary key Focal Entity 12345 may be associated with the following entry of correlated events:
Foc. Ent.: 12345; Scn. 1: Alert; Scn. 2: No Alert; Max. Disp.: Not Suspicious
while in a second set, that primary key may be associated with the following entry of correlated events:
Foc. Ent.: 12345; Scn. 3: Alert; Scn. 4: Alert; Max. Disp.: Suspicious.
Here the two partially correlated event entries will be aggregated together, with the greatest Maximum Disposition assigned, like so:
Foc. Ent.: 12345; Scn. 1: No Alert; Scn. 2: No Alert; Scn. 3: Alert; Scn. 4:Alert; Max. Disp.: Suspicious.
This aggregate entry is a completed correlated event that preserves the information of each entry in a single entry. The correlated event replaces both the entry in the first below-the-line set and the second below-the-line set. Note that this may produce duplicates during the sampling process, which is corrected by the de-duplication step in the sampling process described below with reference to FIG. 5. This ensures that the sampled events gathered in the labeled data gathering process (discussed below with reference to FIGS. 2 and 5) are truly distinct events.

Entries with the same primary key may occur across multiple sets of correlated events. Therefore, the processor 1210 may create the single entry by aggregating the scenario information of many different entries associated with the same primary key. For example, the events may be divided into sets for four threshold sets 355, 360, 365, and 370 as shown and described with reference to FIG. 3B. here, the operation of the processor 1210 may aggregate up to four entries of correlated events into a single entry.

In each set of correlated events for a threshold set, the processor 1210 replaces each entry of partially correlated events associated with the duplicate primary key with an instance of the single entry of completely correlated events. Note that, in some embodiments, correlated event entries are assigned a unique identifier upon creation, such as the row number in the leftmost column of Table 2. Therefore. when replacing the duplicate event entries with the single entry, the multiple unique identifiers may be replaced with a single identifier. This identifier may be the unique identifier of one of the duplicate event entries and may be applied to each instance of the single entry. For example, the processor 1210 may assign the unique identifier of the first duplicate event entry to the other duplicate event entries. Alternatively, the processor 1210 may create one new unique identifier and assign it to each instance of the single entry.

Once the processor 1210 has completed missing information for the correlated events, each correlated event is unique within the threshold set, based on the primary key. The correlated event then contains the information of the scenarios applied to the focal entity and is labeled with the maximum disposition of the scenarios across the threshold sets. Note, there may be duplicate correlated events across threshold sets. Processing at block 470 completes and processing continues to end block 475, where processing ends.

—Below the Line Phase 2—Labeled Data Gathering—

Referring again to FIG. 2, at process block 210 of method 200, the processor 1210 selects a set of sampled events from a set of historic events. The historic events were previously divided by the alerting engine 105 into the set of below-the-line events 150 and the set of above the line events 140 separated by a threshold line 130 indicating that an event is suspicious. The threshold line 130 is defined at least in part by one or more threshold values for a scenario and segment combination.

In some embodiments, the processor 1210 implements a hypergeometric sampling calculator. The processor 1210 selects the set of sampled events from the set of historic events using the hypergeometric sampling calculator. In one embodiment, the set of sampled events is a set of sampled correlated events. For example, a typical tuning window in the anti-money laundering context is one year. This leads to a set of historic events with a very large population size. Note that this number of observations is reduced by the pooling and correlation of the individual events into correlated events. Nevertheless, the population size N of the set of historic events (whether correlated or not) is large. As discussed above sample size approaches a maximum of approximately 600 as population size N increases. Accordingly, the set of sampled events are selected in batches of approximately 600 events.

In some embodiments where the set of historic events is divided into multiple sets, such as of the events falling within a threshold set, the sampling may be carried out in batches with a selection from the events falling within each of the threshold sets. For example, where the set of historic events is divided as described with reference to FIG. 3B, processor 1210 selects a sampling of events from each of threshold sets 355, 360, 365, and 370. This retrieves a batch of approximately 2400 events (approximately 600 events×4 threshold sets) for investigation and labeling.

Regardless of the size of the batch, each sampled event in the batch is presented to a human investigator for investigation and determination as to whether the event is suspicious or not suspicious (for example, by confirming that the event is or is not fraudulent activity). The sampled events may be presented to the human investigator using an output device (such as a display screen or a printer) operably connected to I/O ports 1220. The human investigator, upon making a determination for the event, provides the determination of suspicious or not suspicious to processor 1210 using an input device (such as a keyboard, mouse, or combination thereof) operably connected to I/O ports 1220. The processor 1210 may also receive the determination by input through network device 1255. Processor 1210 accepts the input from the human investigator and parses it to identify whether the investigator determined the event to be suspicious or not suspicious. Process block 210 then completes and processing continues at process block 215.

At process block 215, processor 1210 labels each event in the set of sampled events as either suspicious or not suspicious based on the determination provided by the human investigator. Processing then continues at process block 220.

Process blocks 210 through 215 show a process of accumulating a set of labeled events on which a machine learning model for determining a probability that an observation (such as an event or correlated event) is suspicious can be built. Investigation of an event to determine whether or not it is suspicious activity is a repetitive task. Each event in the set of sampled events is investigated to determine whether the event is suspicious or not suspicious, and a label of suspicious or not suspicious is applied to the event by the processor 1210.

In some embodiments, the selection and labeling repeat at least until a predetermined number of events have been labeled suspicious. The predetermined number is an amount of suspicious events sufficient to build, train, and validate the machine learning model. As the machine learning model is to detect suspicious events, the data set of labeled events may include a minimum number of events labeled suspicious events. Testing and experience have shown that a set of labeled events including 100 confirmed suspicious events is sufficient to build, train, and validate the machine learning model. Experience has shown that approximately half of the machine learning models built from set of labeled events with 50 confirmed suspicious events pass the validation test.

For purposes of illustration, assume that no more than one in 200 events in the set of historic events is actually suspicious. In this case, it will require sampling, investigating, and labeling approximately 20,000 events from the set of historic events before the set of labeled events includes 100 events labeled suspicious. While this still presents an investigative burden, it is far smaller than the burden imposed by a total event sample of 259,200 events as discussed above. Further, the sampling performed in the quick check described above is also useful to accumulate labeled events, so the set of labeled events may already be partially populated in some embodiments where the quick check is performed.

Figure 5:
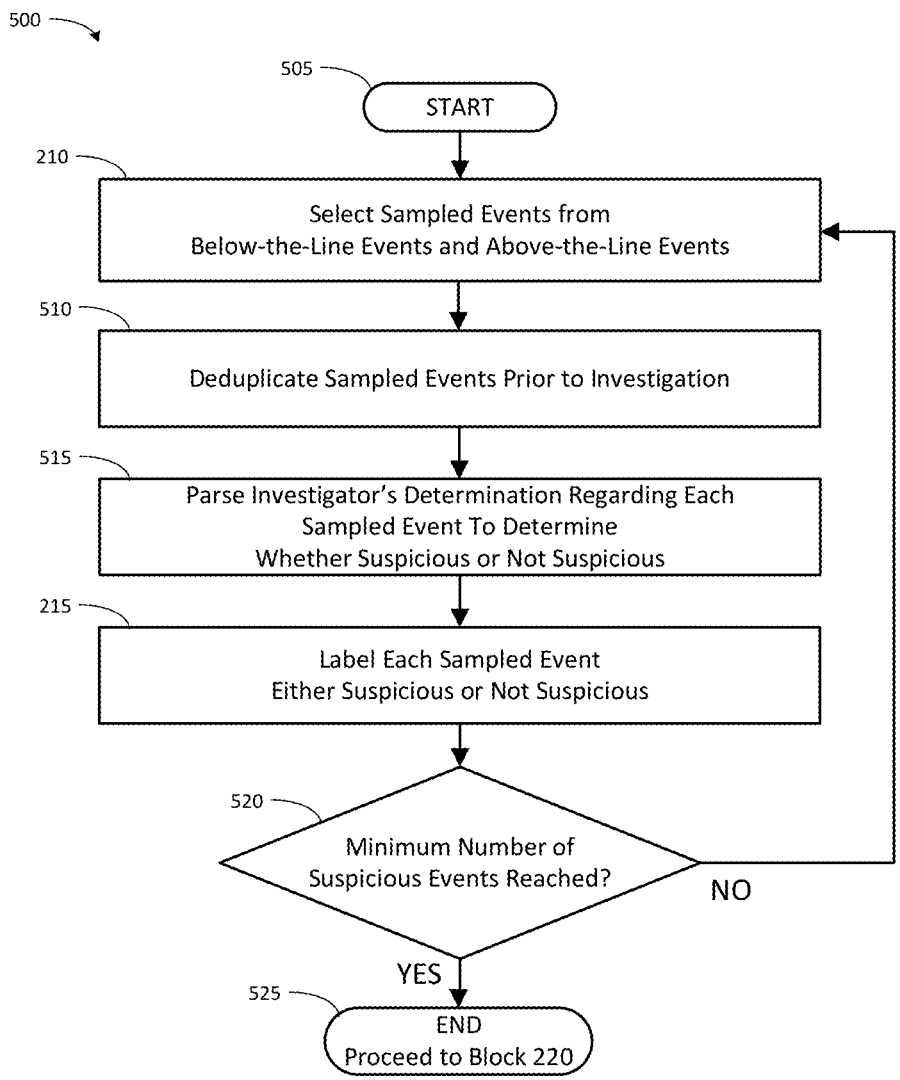
FIG. 5 illustrates an embodiment of a computer-implemented method associated with accumulating labeled suspicious and non-suspicious events.

At FIG. 5, an embodiment of a computer-implemented method 500 associated with accumulating labeled suspicious and non-suspicious events is shown. As shown in FIG. 5, the "select" step of the process block 210 and "label" step of process block 215 from FIG. 2 may repeat in a loop until a set of labeled events has been accumulated that is sufficiently large to build a machine learning model. The method 500 begins at start block 505 and proceeds to process block 210, which is discussed in detail above. Processing continues from process block 210 to process block 510.

At process block 510, the sampled events are de-duplicated prior to being investigated. In some embodiments where pooling and correlating are performed by processor separately for each threshold set, it is possible for there to be an entry (or table row) of correlated events for a given focal entity the events of more than one threshold set. Accordingly, these extra entries should be replaced with new sampled events, or "de-duplicated" using a primary key of focal entity. The sampling process is adjusted to check the primary key of selected events against the events in other sets of events when sampling, and to select an additional replacement event when a match is found. Alternatively, the check may occur after the sampling is completed, and a subsequent sampling may be performed for each set of events to replace any duplicates across the sets.

In those embodiments where the correlation is further divided by time period, the primary key is the combination of focal entity and time period. In this situation, there may be multiple entries per focal entity, so long as there is only one entry per focal entity for any given time period. (Examples herein regarding the primary key may be made without reference to time period for simplicity, but are not intended to exclude the combination of focal entity and time period as the primary key.)

If a duplicate primary key is found, the processor 1210 replaces at least one of the correlated events with the duplicate primary key with an additionally sampled event. Another event for review is selected from the appropriate threshold set to replace the event with the duplicate primary key. The replacement with further sampled events ensures that all sampled correlated events are unique. This avoids duplicated investigation, and that the minimum number of correlated events labeled suspicious is truly met by discrete correlated events. Processing at process block 510 completes, and processing continues to process block 515.

At process block 515, each event in the set of sampled events is investigated to determine whether the event is suspicious or not suspicious. Processor 1210 accepts the determination from the investigator and parses it to identify whether the investigator determined the event to be suspicious or not suspicious. Processing continues at process block 215 which is discussed in detail above. As a result of the labeling of each event in the set of sampled events at process block 215, the labeled events are added to a set of labeled events. Processing continues that decision block 520.

At decision block 520, processor 1210 evaluates whether the predetermined minimum number of events have been labeled suspicious. This could be determined, for example, based on a tally maintained as the events are labeled or based on evaluating the labels of the events included in the set of labeled events. If the predetermined minimum has been reached, processing continues to end block 525, where method 500 completes and the method 200 of FIG. 2 resumes at process block 220. If the predetermined minimum has not been reached, processing returns to process block 210, and continues through again to decision block 520.

—Building a Machine Learning Model—

Referring again to FIG. 2, at process block 220, the processor 1210 builds a machine learning model to calculate for a given event a probability that the given event is suspicious. The machine learning model is built based at least in part on the set of labeled events. In some embodiments, the machine learning model is part of model component 115.

The machine learning model is built to estimate the probability that an observation is suspicious (PS, or "probability of suspicious events"). Processor 1210 builds the machine learning model using labeled data (such as correlated events labeled "suspicious" or "not suspicious"). In some embodiments the machine learning model is built to estimate the probability of suspicious events based on the focal entity's periodical aggregated behavior (which may be monthly, weekly, daily, or some other time period, depending on the applicable scenario). The machine learning model is "cross-scenario" because the machine learning model operates on correlated events. The correlated event contains the behavior pattern of the focal entity across multiple scenario dimensions.

In some embodiments, the machine learning model is built using the full set of labeled events of approximately 20,000 events. The set of labeled events includes the 100 events labeled "Suspicious" and the remaining approximately 19,900 labeled "Not Suspicious."

In some embodiments, the machine learning model is a weight of evidence logistic regression model built as follows: First, the processor 1210 applies a weight of evidence transformation to numeric and categorical variables. Raw variables are not used in this model. Second, the processor 1210 removes weak predictors by univariate filtering. For example, if there are 1000 variables only those variables with a total information value greater than or equal to 0.1 ($T_{IV} \geq 0.1$) are retained. This can significantly reduce the realm of variables. Third, the processor 1210 performs a multicollinearity analysis to identify one or more redundant groups of variables containing redundant information. The processor 1210 retains a single representative variable for each redundant group, and removes the remaining variables containing redundant information. The number of variables is therefore dramatically reduced, but the performance of the model will remain accurate. Fourth, a logistic regression model is prepared using the remaining variables: The probability value of each variable is checked to see if it is non-significant and the most non-significant variable is removed, one at a time, through multiple iterations. This completes the model. Processing then continues at process block 225.

—Training the Machine Learning Model—

Figure 6:
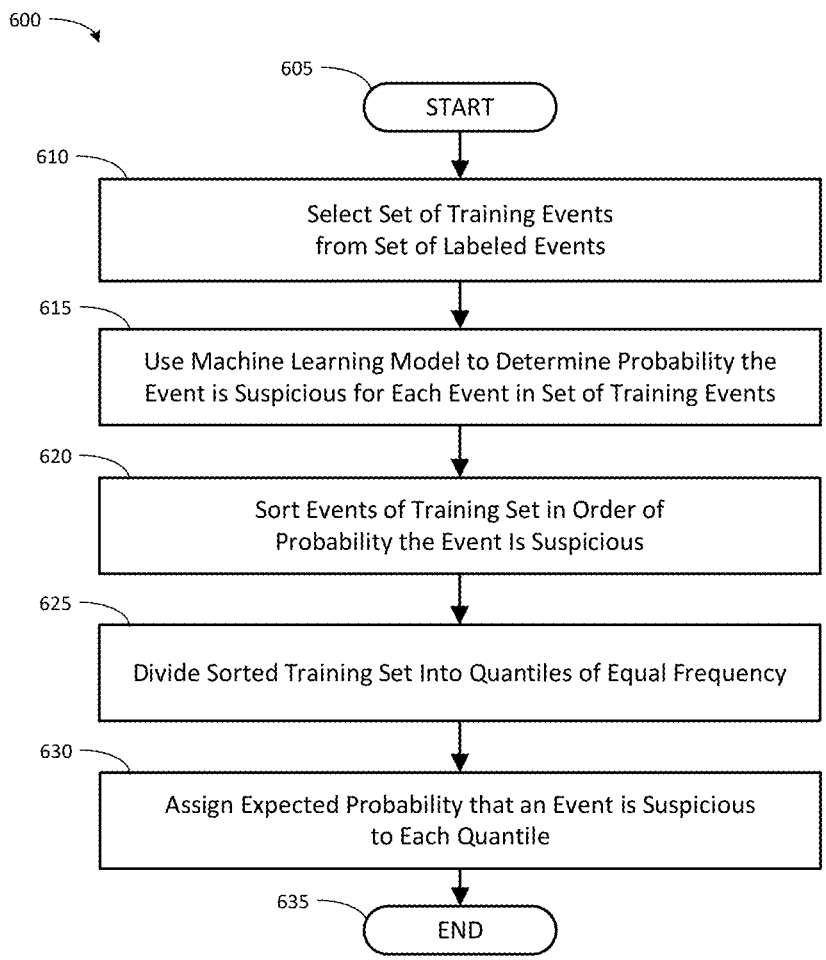
FIG. 6 illustrates an embodiment of a computer-implemented method associated with a process for training the machine learning model to produce calibrated scores.

At process block 225, the processor 1210 trains the machine learning model. Referring now to FIG. 6, an embodiment of a computer-implemented method 600 associated with a process for training the machine learning model to produce calibrated scores is shown. The method 600 is initiated based on various triggers, such as receiving a signal indicating that a machine learning model has been built and that the method 600 should begin for the model. This signal, for example, may be received from (i) a system implementing a method (such as method 200), (ii) a user input to the monitoring system 100 or of the tuning system 155, or (iii) that method 600 is scheduled to be initiated at defined times or time intervals.

The method 600 begins at start block 605 and proceeds to process block 610. At process block 610, processor 1210 selects a training set of events from the set of labeled events. In some embodiments, the processor 1210 splits the set of labeled events into the training set of events and a validation set of events. The processor 1210 performs the split using stratified random sampling. The processor 1210 divides the set of labeled events into two strata by the label indicating whether the event is suspicious or not. The first stratum is of events labeled suspicious. The second stratum is of events labeled not suspicious. The processor 1210 then selects a random sample 50% of the size of the stratum from each of the two strata to form the training set of events. The processor 1210 then forms the validation set of events from the events not selected in each of the strata. (Alternatively, the selected sample may be used to form the validation set of events, the remaining events used to form the training set). Sampling in this way ensures that the proportion of suspicious events to non-suspicious events is the same in both the training set and validation set. For example, if there are 100 events labeled suspicious in the set of labeled events, the processor 1210 will split the set of labeled events into two halves of equal size such that the training set will have 50 events labeled suspicious and the validation set will also have 50 events labeled suspicious. The events of the training set (both suspicious and nonsuspicious) do not overlap with the events of the validation set. Once the processor has thus selected a set of training events from the set of labeled events, process block 610 completes and processing continues at process block 615.

At process block 615, processor 1210 uses the machine learning model to determine the probability of suspicious events for each correlated event in the training set. Processor 1210 uses the machine learning model to calculate a raw probability score of suspiciousness for each event. In some embodiments, processor 1210 associates each raw score with the event it is calculated from. Process block 615 then completes, and processing continues at process block 620.

At process block 620, processor 1210 sorts the events of the training set of events in order of the raw scores. Sorting may be in ascending or descending order, although descending order may be preferred in order to go from high probability to low probability that an event is suspicious. Process block 620 then completes, and processing continues at process block 625.

At process block 625 processor 1210 divides the sorted training set into two or more sections. In some embodiments, each section has an equal number of events. In other embodiments, each section has a roughly equal number of events, if the training set cannot be evenly divided by the number of sections. Each section has an upper boundary probability of suspicious events, and the lower boundary probability of suspicious events. These sections can be referred to as quantiles. Processor 1210 determines the upper boundary probability of suspicious events for each quantile. Processor 1210 also determines the lower boundary probability of suspicious events for each quantile. Once the processor 1210 has created the quantiles, process block 625 completes and processing continues at process block 630.

In an alternative embodiment, at process block 615, processor 1210 stores the raw probability scores as a set of training scores without reference to the events of the training set. At process block 620, the processor 1210 sorts the set of training scores in order of raw score. At process block 625, the processor 1210 divides the sorted set of training scores into the quantiles.

While the training set could be divided into as many quantiles as there are events in the set, large numbers of quantiles are not desirable because (i) the data is rendered too granular, (ii) each additional quantile requires that the validation process be performed for the quantile, and (iii) each additional quantile increases the risk that the scoring is not calibrated (see discussion of validation below). Even percentiles (100 quantiles) may be too many. Preferably, the training set should be divided into 7 to 15 quantiles. In one embodiment, the sorted training set (or sorted set of training scores) is divided into 9 quantiles. A division into 9 quantiles is chosen because the machine learning model is categorizing risk. Risk is often categorized as High, Medium, or Low, with similar subdivisions within these rating categories. Accordingly, the 9 quantiles correspond to risk rating categories such as (High-High, High-Medium, High-Low), (Medium-High, Medium-Medium, Medium-Low), and (Low-High, Low-Medium, Low-Low), respectively in descending order of an average probability of the quantile. Division of the training set into quantiles is further shown and discussed with respect to FIG. 8.

At process block 630, processor 1210 assigns to each quantile an expected probability of suspicious events. For each quantile, processor 1210 calculates an average probability of suspicious events for the quantile from the sorted training scores belonging to the quantile. In various embodiments, this average can be any one of the mean, median, or mode of the scores. In one embodiment, the mean of the scores is preferred. Processor 1210 assigns that average probability for the quantile to be the expected probability of suspicious events ($P_e$) for the quantile. After assigning this expected probability to each section, process block 630 completes. Processing then proceeds to end block 635 where method 600 completes.

—Validating the Machine Learning Model—

Referring again to FIG. 200, once the machine learning model is trained, processing at process block 225 completes, and processing continues at process block 230. At process block 230, the processor 1210 validates that the machine learning model is calibrated. The validation is based at least in part on the set of sampled events.

Figure 7:
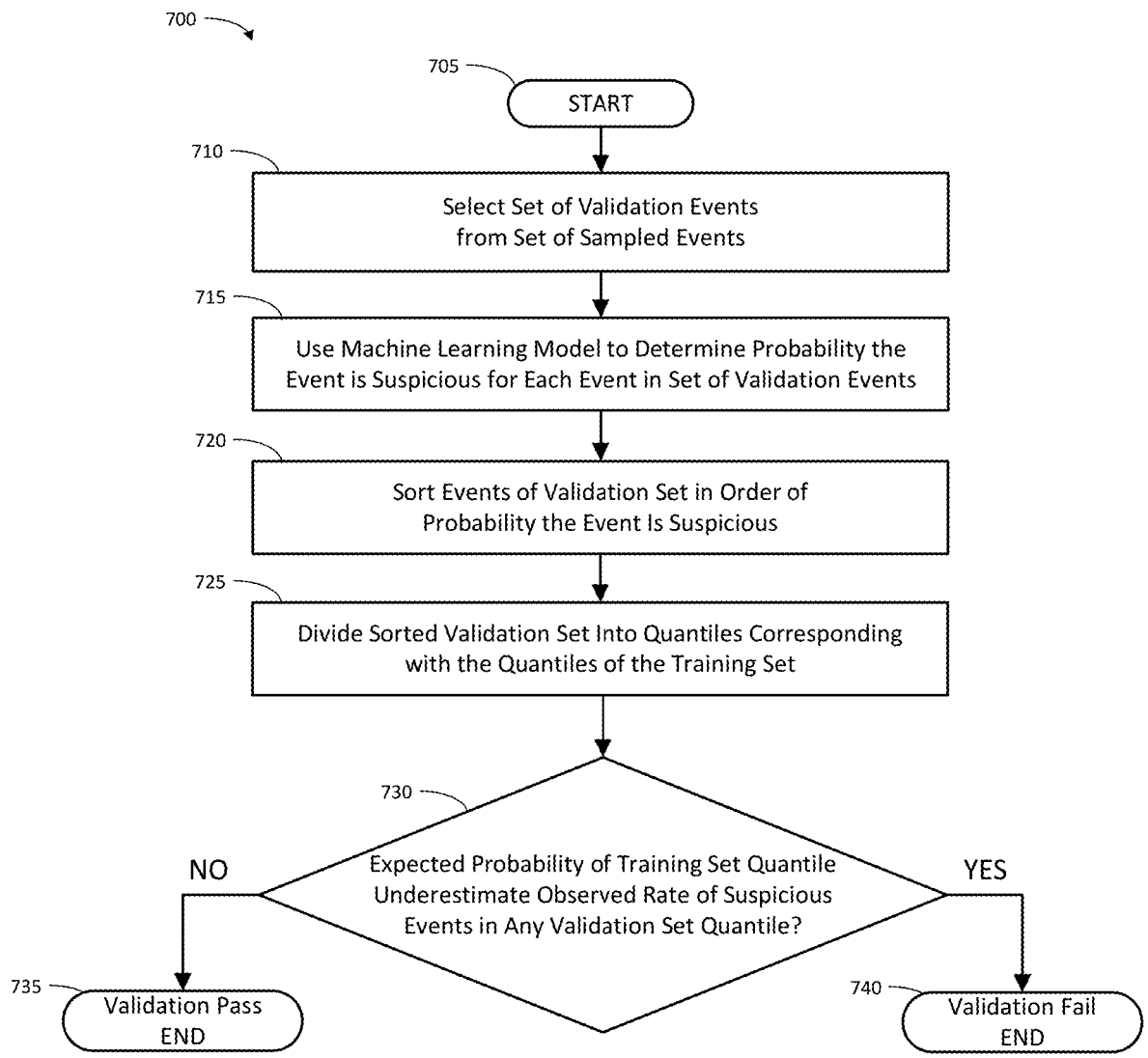
FIG. 7 illustrates an embodiment of a computer-implemented method associated with a process of validation of the calibration of the machine learning model.

Referring now to FIG. 7, an embodiment of a computer-implemented method 700 associated with a process of validation of the calibration of the machine learning model is shown. The method 700 is initiated based on various triggers, such as receiving a signal indicating that a machine learning model has been trained and that the method 700 should begin for the model. This signal, for example, may be received from (i) a system implementing a method (such as method 200), (ii) a user input to the monitoring system 100 or of the tuning system 155, or (iii) that method 700 is scheduled to be initiated at defined times or time intervals.

The method 700 begins at start block 705 and proceeds to process block 710. At process block 710, processor 1210 selects a validation set of events from the set of sampled events. In some embodiments the processor 1210 splits the set of labeled events into the training set of events and the validation set of events using stratified random sampling as discussed above with reference to process block 610 of FIG. 6. Once the processor has thus selected the validation set of events from the set of labeled events, process block 710 completes and processing continues at process block 715.

At process block 715, processor 1210 uses the machine learning model to determine a probability of suspicious events for each event in the validation set. In some embodiments, processor 1210 makes this determination the same way that it does for each event in the training set as discussed above with reference to process block 615 of FIG. 6. Process block 715 then completes, and processing continues at process block 720.

At process block 720, the processor 1210 sorts the events of the validation set in order of probability of suspicious events. In some embodiments this is a sorting similar to that discussed with reference to process block 620 of FIG. 6. Alternatively, the processor 1210 may sort only the set of validation scores in order of the determined probability score, without reference to the events of the validation set. Sorting of the events (or of the scores) may be in ascending or descending order of probability. In some embodiments, it may be preferable to sort in the same order as the sort applied to the training set as discussed above in order to maintain consistency between the sorts of the training set and the validation set. Once the sorting is completed, processing at process block 720 completes and processing continues at process block 725.

At process block 725, the processor 1210 divides the sorted validation set into sections corresponding with the sections of the training set. In this division, there is one section of the validation set for each section of the training set. Each section of the validation set has the same upper and lower boundary probabilities of suspicious events as does the corresponding section of the training set.

In some embodiments, applying the pair of upper and lower boundary probabilities of suspicious events for each quantile of the sorted training set to the sorted validation set forms a corresponding section in the sorted validation set between each pair of boundaries. The sections have the same upper and lower boundary probabilities of suspicious events as the quantile of the training set with which this section corresponds. But, the number of events in each corresponding section of the sorted validation set may differ (be greater than or less than) the number of events in the quantile of the training set. Further, the sections of the sorted validation set are not necessarily of equal frequency. Instead, each section of the sorted validation set may have a different number of events than any other section of the sorted validation set.

Once the division of the sorted validation set into sections is completed, process block 725 completes and processing continues at decision block 730.

At decision block 730, processor 1210 determines whether the machine learning model is calibrated. In one embodiment, the machine learning model is calibrated if, for each section of the validation set, the expected probability of the corresponding section of the training set does not underestimate an observed rate of suspicious events in the section of the validation set. The machine learning model is not calibrated if, for any section of the validation set, the expected probability of the corresponding section of the training set underestimates an observed rate of suspicious events in the section of the validation set.

Before the machine learning model is built, it is unknown whether or not the model will be calibrated. Area under curve (AUC) validation is not sufficient to validate that the machine learning model is calibrated because AUC validation is only a rank order testing. Instead, the test should confirm not only that the order but also the magnitude of the probability of suspicious events (PS) is correct.

Passing an appropriate statistical distribution test for a quantile ensures that an expected probability of suspicious events ($P_e$) for the quantile is stable. Passing that statistical distribution test in all quantiles validates that the model is calibrated and confirms that the model is appropriate for use for below-the-line investigation. The formula of the machine learning model is fixed, and an expected probability of an observations is calculated by using the fixed, stable, and validated formula. In some embodiments, the β-distribution test or the binomial test calculated by normal distribution may be satisfactory statistical distribution tests for this validation.

As previously mentioned, in validation, the β-distribution is preferred over the binomial test calculated by normal distribution because the β-distribution is more assumption free. A test with assumptions is only valid when the assumptions are met, so a test with many assumptions is of limited use. The β-distribution fits proportion data (for example, the probability of suspicious events of a group of events that make up a risk rating category) distribution naturally, therefore no additional assumptions are needed on the data or event.

Alternatively, the binomial test calculated by normal distribution could be used, assuming suspicious events are independent. Further, normal distribution approximation can be used to calculate binomial test results given the following assumptions are also satisfied:
- total number of events (n) is large;
- the product of the total number of events (n) and the sample mean of the probability of suspicious events ($\widehat{PS}$) is less than 5 (n* $\widehat{PS}$ >5); and
- the product of the total number of events (n) and the complement of the sample mean of the probability of suspicious events ($\widehat{PS}$) is less than 5 (n*(1− $\widehat{PS}$ )>5).

In one embodiment, in the β-distribution test for a quantile of the training data set, the null hypothesis ($H_0$) is that the expected probability of suspicious events ($P_e$) assigned for the quantile (as discussed above with reference to FIG. 6 at process block 630) is correct and does not underestimate the observed rate of suspicious events ($P_o$) in the corresponding section of the validation set.

In one embodiment, this null hypothesis may be expressed in a SAS programming language implementation as:

$P_o \Leftarrow \text{BETAINV}(1-\alpha, \text{round\_up}(n*P_e), n-\text{round\_up}(n*P_e))$, where
- $P_e$ is the expected probability of suspicious events assigned for the quantile;
- $P_o$ is the observed rate of suspicious events in the corresponding section of the validation set,
- n is the total number of observations (event and probability pairs, or probabilities alone) in the quantile;
- α is the level of significance for a right-tailed (upper-tailed) test;
- the round_up function returns next integer equal to or larger than its argument; and
- the $\beta^{-1}$ (beta invert) function BETAINV (p,a,b) returns the pth quantile from the beta distribution with shape parameters a and b.

In the β-distribution test for a quantile of the training data set, the alternative hypothesis ($H_A$) is that the expected probability of suspicious events ($P_e$) assigned for the quantile is not correct, and underestimates the observed rate of suspicious events ($P_o$) in the corresponding section of the validation set. This alternative hypothesis may be expressed more formally, for example, in a SAS programming language implementation as:

$P_o > \text{BETAINV}(1-\alpha, \text{round\_up}(n*P_e), n-\text{round\_up}(n*P_e))$, with the same definitions for the arguments and functions as described above.

While examples may be given in SAS programming language, other programming languages may also be used to implement systems and methods disclosed herein. Function names, formatting, and input values may require adjustment for implementation.

At decision block 730, processor 1210 performs this β-distribution test of the expected probability of suspicious events ($P_e$) for each quantile of the set of training events. In the embodiment shown in FIG. 7, the determination as to whether the machine learning model is calibrated is a test for the alternative hypothesis ($H_A$). In in another embodiment, the determination as to whether the machine learning model is calibrated is a test for the null hypothesis ($H_0$). In such an embodiment, the "Yes" and "No" outputs of decision block 730 would be reversed.

In the embodiment shown in FIG. 7, if the expected probability of the corresponding quantile of the training set never underestimates the observed rate of suspicious events in any section of the validation set, processing at decision block 730 completes with a "No" determination and proceeds to end block 735, indicating that the machine learning model has passed validation. If the expected probability of the corresponding section of the training set underestimates the observed rate of suspicious events in any section of the validation set, processing at decision block 730 completes with a "Yes" determination and proceeds to end block 740, indicating that the machine learning model has failed validation. In some embodiments, processor 1210 may provide these various indications to other system components.

If the machine learning model passes validation, processor 1210 may use the validated machine learning model to estimate the probability of suspicious events ($P_e$) for unlabeled events in the set of historic events with confidence that this probability score is calibrated. If the machine learning model fails validation users may attempt to tune the model to make it able to pass the β-distribution test, or even build, train, and attempt to validate a new machine learning model.

Referring to FIG. 2, once validation of process block 230 is complete, processing continues at process block 235.

—Example Division of the Sorted Training and Validation Sets—

Figure 8:
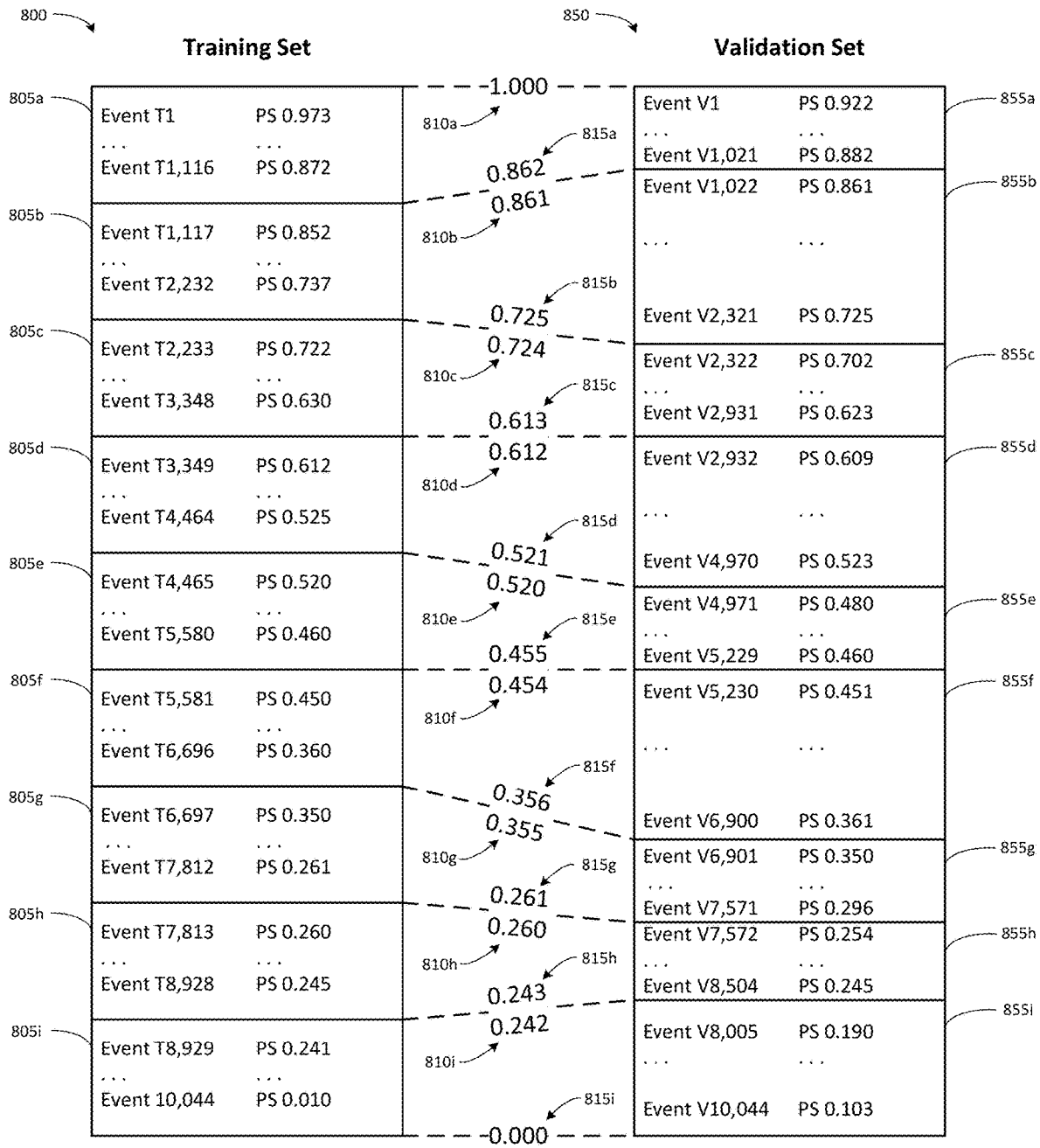
FIG. 8 illustrates an exemplary set of training events alongside an exemplary set of validation events, each set sorted in descending order of probability of suspicious events.

Referring now to FIG. 8, an exemplary set of training events 800 sorted in descending order of probability of suspicious events (PS) is shown. The exemplary set of training events 800 has 10,044 events in it: 50 events labeled suspicious and 9,994 labeled not suspicious. The number of events in the exemplary set of training events 800 was selected for convenience in the example, and in practice the set of training events may vary in size. The set of training events is divided into nine quantiles 805*a*-805*i*. The quantiles 805*a*-805*i* are each of equal size and each have 1,116 events in them.

The boundary between each quantile is defined by upper boundary probabilities of suspicious events 810*a*-810*i* and lower boundary probabilities of suspicious events 815*a*-815*i*. The probability of suspicious events (PS) for the events in the quantile range between the upper and lower boundary probabilities. In some embodiments, processor 1210 may select the upper boundary probabilities by selecting a value just below the probability of suspicious events (PS) of the event in the next higher-suspicion quantile with the least probability of suspicious events. This is shown for example at upper boundary 810*h*, where the value of the upper boundary probability is 0.260. This is just below the probability of suspicious events (PS) of 0.261 for Event T7,812—the event having the least probability of suspicious events (PS) in the next higher-suspicion quantile, quantile 805*g*.

Commercially available statistical software may include functionality that will select appropriate quantile boundaries if provided with a sorted dataset and the total number of quantiles. In some embodiments where that the events are sorted in descending probability of suspicious events (PS), processor 1210 may select as the boundary between the nth quantile and the n+1th quantile is by the average of the lowest PS in the nth quantile and the highest PS in the n+1th quantile. The first quantile's upper boundary is 1, while the last quantile's lower boundary is 0. In some other embodiments, processor 1210 may select the upper boundary probabilities for a quantile by selecting a value that is an average of (i) the probability of suspicious events (PS) of the event in the quantile with the highest probability of suspicious events and (ii) the probability of suspicious events (PS) of the event in the next higher-suspicion quantile with the least probability of suspicious events. This is shown for example at upper probability boundary 810*g*, where the value 0.355 is the average of the probability of suspicious events for T6,696: 0.350 and the probability of suspicious events for T6,697: 0.360. Selection of lower probability boundaries 815*a*-815*i* for a quantile may be performed in a similar manner. Other methods for selecting boundary values between quantiles will occur to a person of ordinary skill in the art.

FIG. 8 also shows an exemplary set of validation events 850 sorted in descending order of probability of suspicious events (PS) is shown. Like exemplary set of training events 800, exemplary set of validation events 850 as 10,044 events in it—50 events labeled suspicious and 9,994 labeled not suspicious. As discussed above, the events of exemplary set of validation events 850 are distinct from the events of the exemplary set of training events 800.

Processor 1210 applies upper boundary probabilities of suspicious events 810*a*-810*i* and lower boundary probabilities of suspicious events 815*a*-815*i* to the exemplary set of validation events 950. This separates the exemplary set of validation events 950 into nine sections 855*a*-855*i*, each of which respectively correspond to the nine quantiles 805*a*-805*i* of exemplary set of training events 800. The nine quantiles 805*a*-805*i* share with their corresponding sections 855*a*-855*i* the upper 810*a*-810*i* and lower 815*a*-815*i* boundary probabilities that an event is suspicious. A section may contain fewer events (or probabilities) than its corresponding quantile, as shown for example at section 855*a* and quantile 805*a*. A section may contain more events (or probabilities) than its corresponding quantile, as shown for example at section 855*b* and quantile 805*b*. Further, each section of the exemplary set of validation events 950 may contain more or fewer events (or probabilities) than other sections. Compare, for example, the number of events in section 855*a* and section 855*b*.

—Identify Scenario and Segment for Tuning—

Referring again to FIG. 2, at process block 235, the processor 1210 determines a scenario and segment combination to be tuned. In some embodiments of the present invention, the building, training, and validation of the machine learning model may be described as translating a null hypothesis ($H_0$) of the prior sampling methodology for investigating the below-the-line population into a null hypothesis ($H_0$) of the machine learning model.

The expected rate of suspicious events ($P_e$), tolerable rate of suspicious events ($P_t$), and degree of confidence or power ($P_w$) values are parameters of the hypergeometric sampling calculator previously used for below-the-line sampling. The expected rate of suspicious events ($P_e$) may be set to 0 ($P_e$=0) in the parameters of the hypergeometric sampling calculator because the below-the-line population should have no instances of suspicious events.

In some embodiments, the tolerable rate of suspicious events ($P_t$) may be set at different levels. For example, the tolerable rate of suspicious events ($P_t$) may be set to 0.05 ($P_t$=0.05), 0.03 ($P_t$=0.03), 0.01 ($P_t$=0.01), or 0.005 ($P_t$=0.005). For the same sampling calculator and same size population, the lower the tolerable rate of suspicious events ($P_t$), the higher the sample size the sampling calculator will return. Historically, the above-the-line suspicious activity report rate is around 1-2%. Accordingly, the tolerable rate of suspicious events ($P_t$) for sampling is set below that at 0.5%. Similarly, the tolerable rate of suspicious events ($P_t$) for sampling the first below-the-line set is also set at 0.5% to ensure data surrounding the threshold line is inspected very cautiously. The tolerable rate of suspicious events ($P_t$) for data further below the threshold line (less risky), such as in the second below-the-line set, can be set at 3%. The tolerable rate of suspicious events ($P_t$) for data furthest below the threshold line (least risky), such as in the third below-the-line set, can set at 5%. These risk tolerances are conservative. Less conservative risk tolerances, up to 10%, may be appropriate.

The power ($P_w$) value of the sampling calculator is the probability of detecting an abnormality—referred to in statistics as the alternative hypothesis ($H_A$) to the null hypothesis ($H_0$)—when the abnormality ($H_A$) is true. A higher power ($P_w$) value reflects a higher degree of confidence that the sampling calculator will capture data showing the abnormality if the abnormality exists in the event population. Power ($P_w$) is generally expressed as a value between 0 and 1 inclusive. Here, for example, power ($P_w$) can be set to 0.95 ($P_w$=0.95). This reflects a conservative, high degree of confidence that sampling calculator will capture data showing an excessive amount of suspicious events if there is an excessive amount of suspicious events in the set of historic events.

The null hypothesis ($H_0$) of the prior sampling methodology is that this expectation is true, and the below-the-line population has no instances of suspicious events ($H_0$: $P_e$=0). More specifically, the null hypothesis ($H_0$) is that with a 95% degree of confidence ($P_w$=0.95) the actual rate ($P_A$) of suspicious events in the set of historic events does not exceed a preset tolerable rate of suspicious events ($P_t$). ($H_0$: $P_A<=P_t$, $P_w$=0.95).

Any dynamically formed group of events, such as the event belonging to a scenario and segment combination, the events belonging to just one focal entity, etc., may be referred to as a sector. In the machine learning model, the calibrated probability that an observation is suspicious (calibrated PS) for a sector is the best estimated rate of suspicious events ($P_B$) plus a conservative add-on to account for variation. In some embodiments the $P_B$ for a sector is the average of the calibrated PS score for the events of the sector ($P_B$=avg (calibrated PS score)), and the conservative add-on is the confidence interval (CI) of the β-distribution.

Translating a null hypothesis of the traditional sampling method into the null hypothesis of the machine learning model, the null hypothesis becomes that, for the sector, the best estimated rate of suspicious events ($P_B$) plus the confidence interval (CI) of the β-distribution is less than or equal to the tolerable rate of suspicious events ($P_t$). ($H_0$: $P_B+CI<=P_t$).

This null hypothesis may be expressed more formally, for example, in a SAS programming language implementation as:

BETAINV(1−α,round_up($n_{sector}*P_B$), $n_{sector}$−round_up($n_{sector}*P_B$))<=$P_t$, where
$P_B$ is the best estimated rate of suspicious events for the sector, which may in some embodiments be the avg (calibrated PS Score) discussed above;

$P_t$ is the tolerable rate of suspicious events for the sector;
$n_{seg}$ is the total number of observations (events) in the sector;
1−α is equal to the confidence interval (CI) of the β-distribution, where a is the level of significance for a right-tailed (upper-tailed) test;
the round_up function returns next integer equal to or larger than its argument; and
the $β^{-1}$ (beta invert) function BETAINV (p,a,b) returns the pth quantile from the beta distribution with shape parameters a and b.

Or, in other words with the confidence level of 1−α, the best estimated rate of suspicious events for the sector's population does not exceed a preset tolerable rate of suspicious events.

A probability that a sector is suspicious (PS) may be said to be a calibrated probability when that probability is equal to the best estimated rate of suspicious events for the sector $P_B$ plus a conservative add-on. Observations may fall within different quantiles, and therefore have a different calibrated PS Score. All these calibrated PS scores are averaged to form the best estimated rate of suspicious events ($P_B$) for the sector.

In some embodiments, processor 1210 uses the machine learning model's null hypothesis ($H_0$) to determine which scenario and segment combinations require updates to their threshold values. A violation of the machine learning model's null hypothesis ($H_0$) for any set of events (such as a below-the-line threshold set of events or scenario and segment combination set of events) under observation shows an excessive amount of suspicious events in that set of events. This indicates that the threshold values used to generate that set of events may require adjustment. This adjustment should broaden the threshold values to capture the suspicious events present in the set of events. Thus, the machine learning model enables ongoing tuning of parameter thresholds in rules component 125 of alerting engine 105 by processor 1210. For example, the processor 1210 may automatically determine that a rate of suspicious events estimated by the machine learning model in a sector of the set of events exceeds a preset tolerable rate of suspicious events for the sector, indicating that alerting engine thresholds for the sector should be tuned.

Figure 9:
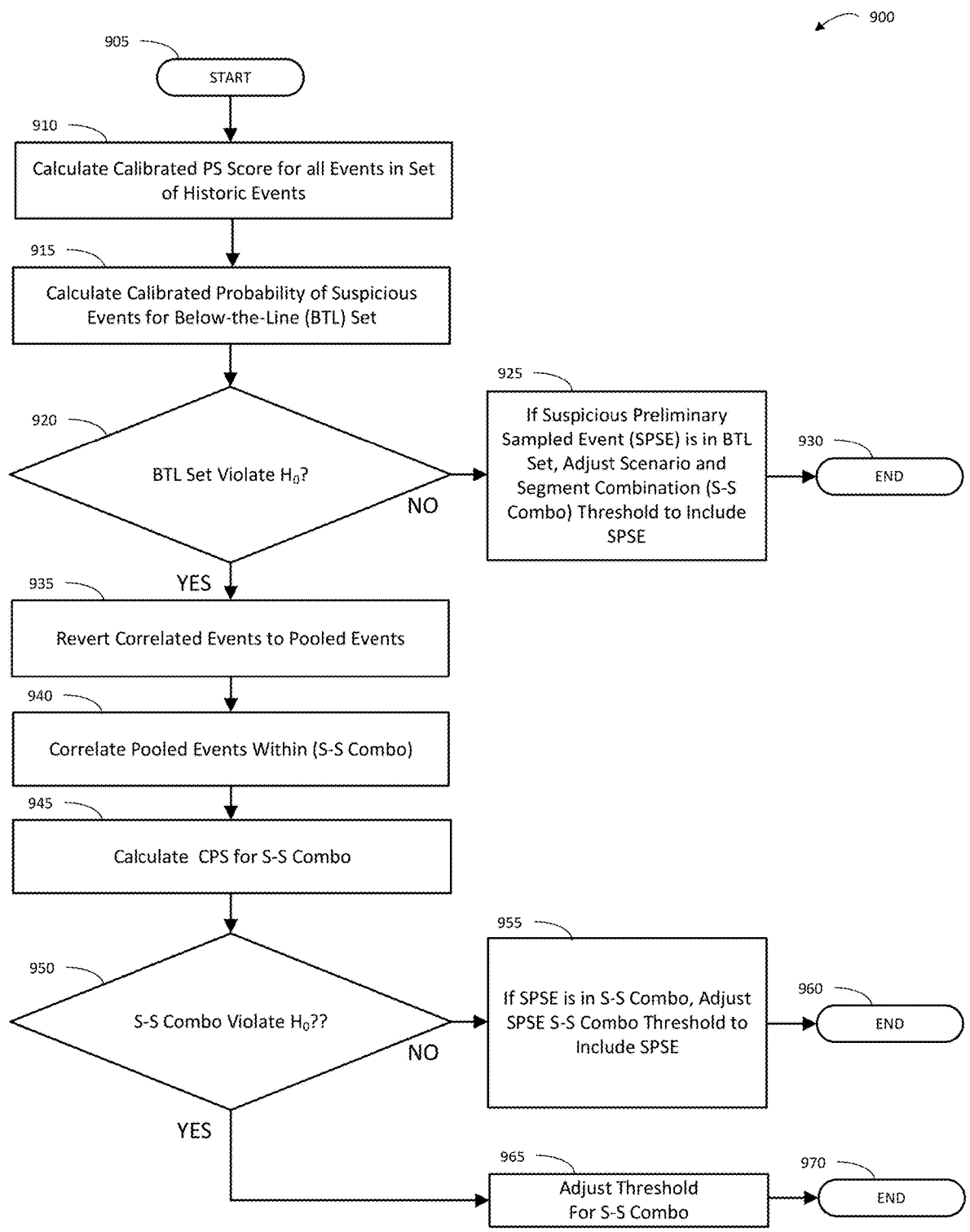
FIG. 9 illustrates an embodiment of a computer-implemented method associated with identifying scenario and segment combinations for threshold adjustment.

Referring now to FIG. 9, a computer-implemented method 900 associated with identifying the sectors (scenario and segment combinations) for threshold adjustment is shown. In this embodiment, tuning is directed to the scenario and segment combinations that violate the machine learning model's null hypothesis ($H_0$). Processing begins at start block 905 and proceeds to process block 910.

At process block 910, processor 1210 calculates a calibrated probability of suspicious event score (calibrated PS score) for correlated events in the set of historic events. In some embodiments, the calibrated PS score is calculated as follows: First, the processor 1210 uses the completed, trained, and validated model to generate a raw probability score that a correlated event is suspicious (raw PS score) for each correlated event in the set of historic events. Second, the raw PS score is used to determine which quantile in the training data set has upper and lower probability boundary values between which the raw PS score falls. The expected probability score of this quantile is then assigned to the correlated event as the correlated event's calibrated PS score. The calibrated PS score may be used in place of the raw score for each event in below-the-line threshold tuning calculations, as the individual raw scores may be considered too fine-granular and therefore too volatile. Once a calibrated PS score is calculated for each correlated event the set of historic events, process block 910 completes and processing continues at process block 915.

As discussed above, the set of historic events is divided into above-the-line events and below-the-line events. In some embodiments, the set of below-the-line events is further divided by threshold set into multiple below-the-line sets, such as by threshold sets 360, 365, and 370 discussed above. In these embodiments, following completion of process block 910, the process 900 is repeated from process block 915 for each of the below-the-line sets. In other embodiments where the set of below-the-line events is not further subdivided, processing continues from process block 910 to process block 935.

At process block 915, processor 1210 calculates the calibrated probability of suspicious events (CPS) for a below-the-line set (that is, the below-the-line set is the dynamically formed sector). In some embodiments, the calibrated probability of suspicious events (CPS) for an observation of a set of events (rather than a single event) is equal to the best estimated rate of suspicious events ($P_B$) for the set plus a conservative add-on (CI). The best estimated rate of suspicious events ($P_B$) for the set may be the average of the calibrated probability of suspicious events (CPS) of the individual correlated events 1-n in the set. $P_B$=avg ($CPS_{event\_1}, \ldots, CPS_{event\_n}$)), and a conservative add-on is a confidence interval (CI) of the β-distribution of the set.

Accordingly, at process block 915, processor 1210 calculates the average of the calibrated probability of suspicious events (CPS) of the individual correlated events 1-n in the below-the-line set and adds to the average the confidence interval of the β-distribution of the below-the-line set ($CI_{set}$) to find the calibrated probability that the below-the-line set is suspicious ($CPS_{set}$). ($CPS_{set}$=avg($CPS_{set\_event\_1}, \ldots, CPS_{set\_event\_n}$)+$CI_{set}$). Processor 1210 stores the results ($CPS_{set}$) of this calculation (for example in memory 1215, storage 1235, or data 1240) for later evaluation, and process block 915 completes. Processing continues at decision block 920.

At decision block 920, processor 1210 determines whether the below-the-line set violates the machine learning model's null hypothesis ($H_0$). That null hypothesis ($H_0$) is that the calibrated probability that the below-the-line set is suspicious ($P_{B\_set}$+$CI_{set}$, also written as $CPS_{set}$, as described above) is less than or equal to the tolerable rate of suspicious events ($P_t$). ($H_0$: $P_{B\_set}$+$CI_{set}$<=$P_t$, or $H_0$: $CPS_{set}$<=$P_t$). Processor 1210 retrieves $CPS_{set}$ and $P_t$ from storage and compares them. If the value of $CPS_{set}$ is less than or equal to the value of $P_t$, the null hypothesis is not violated. If the value of $CPS_{set}$ is greater than the value of $P_t$, the null hypothesis is violated.

If processor 1210 determines that a below-the-line set does not violate the machine learning model's null hypothesis ($H_0$), decision block 920 completes (NO) and processing continues at process block 925. If (i) the below-the-line set does not violate the machine learning model's null hypothesis, and (ii) the suspicious preliminary sample event detected at process block 320 of FIG. 3A is included in the below-the-line set, then thresholds should be adjusted to capture at least the suspicious preliminary sample event detected at process block 320 of FIG. 3A. This is a conservative approach, because the rate of suspicious events in the below-the-line set is tolerable (the machine learning model's null hypothesis ($H_0$) is not violated), and the suspicious preliminary sample event is the only identified suspicious event in the below-the-line set.

Accordingly, at process block 925, the processor 1210 determines if the suspicious preliminary sample event is in the below-the-line set. If so, processor 1210 records (for example, in memory 1215, storage 1235, or data 1240) the scenario and segment combination adjustment needed in order to capture the suspicious preliminary sample event. In those embodiments where there are multiple sets of below-the-line events, processing may repeat for each set, continuing at decision block 920. If there are no remaining sets at the completion of process block 925, processing continues to end block 930 where process 900 ends.

If processor 1210 determines that a below-the-line set violates the machine learning model's null hypothesis ($H_0$), decision block 920 completes (YES) and processing continues at process block 935. If the below-the-line set violates machine learning model's null hypothesis ($H_0$) at a below-the-line set level, then the lower level scenario and segment combination that caused that violation should be identified.

At process block 935, processor 1210 reverts the set of below-the-line events from correlated events to pooled events. Processor 1210 thus returns each deduplicated, correlated event in the set of below-the-line events to its pooled form prior to any correlation or deduplication. In one embodiment, the reverse of the deduplicating and the correlating processes discussed above may be performed to reconstruct the pooled events for the set of below-the-line events. In another embodiment, the pooled events are retained (for example in storage 1235 or data 1240) as pooled events during the correlating and the duplicating processes, and the events of the set are simply selected from these retained pooled events.

This reversion follows the determination in decision block 920 that the below-the-line set violates machine learning model's null hypothesis ($H_0$); or in other words, that the best estimated probability of suspicious events for the events in the set (plus a conservative add-on) exceeds the given preset tolerable rate of suspicious events. Once processor 1210 has reverted the set of below-the-line events from correlated events to pooled events, processing at process block 935 completes and processing proceeds to process block 940.

At process block 940, processor 1210 correlates the pooled events of the below-the-line set within each individual scenario and segment combination. To do so, for each scenario and segment combination present in the pooled events of the below-the-line set, processor 1210 locates each event belonging to that scenario and segment combination and forms a set of scenario and segment combination events. Processor 1210 then correlates each event in the set of pooled events within the set of scenario and segment combination at least by focal entity, according to the correlation process discussed above. This creates a set of combination correlated events. Once processor 1210 has correlated pooled events within the scenario and segment combination, process block 940 completes and processing continues at process block 945.

At process block 945, processor 1210 calculates the calibrated probability that an observation is suspicious (CPS) for the scenario and segment combination (that is, the set of events in the scenario and segment combination is the dynamically formed sector). This calculation is similar to that discussed above with reference to process block 915. Processor 1210 calculates the average of the calibrated probability of suspicious events (CPS) of the individual events 1-n in the scenario and segment combination and adds to it the confidence interval of the β-distribution of the scenario and segment combination ($CI_{ss}$) to find the calibrated probability that the scenario and segment combination is suspicious ($CPS_{ss}$). ($CPS_{ss}$=avg($CPS_{ss\_event\_1}$, ..., $CPS_{ss\_event\_n}$)+$CI_{ss}$). Processor 1210 stores the results ($CPS_{ss}$) of this calculation for later evaluation, and process block 945 completes. Processing continues at decision block 950.

At decision block 950, processor 1210 determines whether the scenario and segment combination violates the machine learning model's null hypothesis ($H_0$). That null hypothesis ($H_0$) is that the calibrated probability that the scenario and segment combination is suspicious ($CPS_{ss}$, or $P_{B\_ss}$+$CI_{ss}$) is less than or equal to the tolerable rate of suspicious events ($P_t$). ($H_0$: $CPS_{ss}<=P_t$). Processor 1210 retrieves $CPS_{ss}$ and $P_t$ from storage and compares them. If the value of $CPS_{ss}$ is less than or equal to the value of $P_t$, the null hypothesis is not violated. If the value of $CPS_{ss}$ is greater than the value of $P_t$, the null hypothesis is violated.

If processor 1210 determines that a below-the-line set does not violate the machine learning model's null hypothesis ($H_0$), decision block 950 completes (NO) and processing continues at process block 955. If (i) the scenario and segment combination does not violate the machine learning model's null hypothesis, and (ii) the suspicious preliminary sample event detected at process block 320 of FIG. 3A is included in scenario and segment combination, then thresholds of the scenario and segment combination should be adjusted to capture at least the suspicious preliminary sample event detected at process block 320 of FIG. 3A. This is a conservative approach, because the rate of suspicious events in the scenario and segment combination is tolerable (the machine learning model's null hypothesis ($H_0$) is not violated), and the suspicious preliminary sample event is the only identified suspicious event in the scenario and segment combination. This adjustment of the thresholds need not be repeated if the adjustments were previously made for the scenario and segment combination during any performance of process block 925.

Accordingly, at process block 955, the processor 1210 determines if the suspicious preliminary sample event is in the scenario and segment combination. If so, processor 1210 records (for example, in memory 1215, storage 1235, or data 1240) the scenario and segment combination adjustment needed in order to capture the suspicious preliminary sample event. Processing at process block 955 then completes.

Processing repeats, continuing at decision block 935, for each scenario and segment combination belonging to the below-the-line set, until no scenario and segment combinations belonging to the below-the-line set remain. If there are no remaining scenario and segment combinations belonging to the below-the-line set at the completion of process block 955, processing continues to end block 960 where process 900 ends.

Returning now to decision block 950, if processor 1210 determines that the scenario and segment combination violates the machine learning model's null hypothesis ($H_0$), decision block 950 completes (YES) and processing continues at process block 965. If the scenario and segment combination violates machine learning model's null hypothesis ($H_0$), then processor 1210 has identified a scenario and segment combination that may require adjustment of a threshold.

At process block 965, processor 1210 determines and records (for example, in memory 1215, storage 1235, or data 1240) a threshold adjustment for the scenario and segment combination. In some embodiments this threshold adjustment is the minimum adjustment needed to cause the scenario and segment combination not to violate the machine learning model's null hypothesis ($H_0$). For example, the processor 1210 may automatically generate the tuned threshold value in response to identifying the sector (scenario and segment combination) that violates the null hypotheses ($H_0$) and needs tuning by selecting to be the tuned threshold value a parameter value of an event predicted to be suspicious by the machine learning model that is beyond the threshold value.

In another example, the processor may automatically generate the tuned threshold value by selecting to be the tuned threshold value the percentile threshold value of the next percentile band that brackets (or includes within the percentile) the parameter value of the event predicted to be suspicious by the machine learning model. In one embodiment, the current below-the-line threshold for the scenario and segment combination is adjusted down one threshold set. For example, if the current below-the-line threshold is at the 85th percentile, the adjusted below-the-line threshold would be at the 80th percentile (where each threshold set is five percentile wide). In a scenario and segment combination, a threshold value of each parameter has a threshold set. Aggregating the threshold set of all parameters by the AND OR rule (as described above) yields the event level percentile for the scenario and segment combination. The threshold set of a threshold value of any parameter may be adjusted downward, as long as it causes the event level percentile to drop by one threshold set.

Processing repeats, continuing at decision block 935, for each scenario and segment combination belonging to the below-the-line set, until no scenario and segment combinations belonging to the below-the-line set remain. If there are no remaining scenario and segment combinations belonging to the below-the-line set at the completion of process block 965, processing continues to end block 970 where process 900 ends.

—Parameter Generation and Tuning the Alerting Engine—

Referring again to FIG. 2, once the determining of scenario and segment of process block 235 completes, processing continues at process block 240. At process block 240, the processor 1210 generates a tuned threshold value for the scenario and segment combination. The generation is based at least in part on the probabilities calculated by the machine learning model and may be as described above with reference to process block 925, 955, or 965 of FIG. 9. Processor 1210 retrieves the threshold adjustment for the scenario and segment combination from storage. Processor 1210 generates a tuned threshold value from the threshold adjustment.

Processing continues at process block 245. At process block 245, the processor 1210 tunes the alerting engine by replacing one or more of the threshold values with the tuned threshold value. This causes the threshold line to be adjusted to reduce errors by the alerting engine in classifying events as not suspicious. In some embodiments, the replacement may be of one or more parameter threshold values in rules component 125 with the tuned threshold value. In one embodiment, the tuned threshold value is a percentile threshold value (defining a boundary of a percentile band) for a percentile band that includes a parameter value (for an event predicted to be suspicious) that is below (or beyond) the threshold value. In one embodiment, the percentile threshold value may be identified as shown and described herein with reference to FIG. 9, and stored for later use. In one embodiment, executing tuning component 120, processor 1210 retrieves the tuned threshold value from storage and replaces a parameter threshold values in rules component 125 with it. Processing continues to end block 250, where it completes.

Upon completion of method 200, alerting engine 105 is capable of detecting a suspicious event that it was not previously capable of detecting. In some embodiments, where such an event is included in the incoming events 135, alerting engine 105 detects the event as above-the-line and sends it for suspicious activity investigation 145.

—Ongoing Maintenance—

A built, tested, and validated machine learning model may become out of date over time. Accordingly, this existing machine learning model should be re-validated, for example annually, using a new set of labeled historic events. The new set of labeled historic events is selected from a more recent training window for example the 12 months immediately preceding re-validation. As the alerting engine 105 continues to send above-the-line events 140 for suspicious activity investigation 145, at least some of the labeled events required for re-validation may already have been gathered. In this case, the minimum number of suspicious events can be reduced to 50 (and the non-suspicious events to approximately 10,000), as there is no need to build and train the already existing machine learning model. If there are insufficient labeled suspicious events, method 400 for accumulating labeled suspicious events is initiated and performed to complete a new validation set of labeled events.

Referring again to FIG. 7, method 700 for validation of the calibration of the machine learning model may be initiated and performed in order to re-validate an existing machine learning model. In this case, the selecting step of the process block 710 is minimal and may be simple acceptance of the new validation set of labeled events because there is no need to divide out a training set by proportional sampling. Method 700 proceeds to completion with either a re-validation of the existing machine learning model at end block 735 or a failure of re-validation at end block 740.

If the existing machine learning model fails re-validation, processor 1210 may send or receive a signal that causes method 200 to commence in order to build a replacement machine learning model. Recently investigated above-the-line and below-the-line events may be used together with the old labeled data to build the replacement machine learning model. These ongoing processes greatly reduce the investigative work load to accumulate labeled data during model maintenance.

—Additional Example Embodiment—

Figure 10:
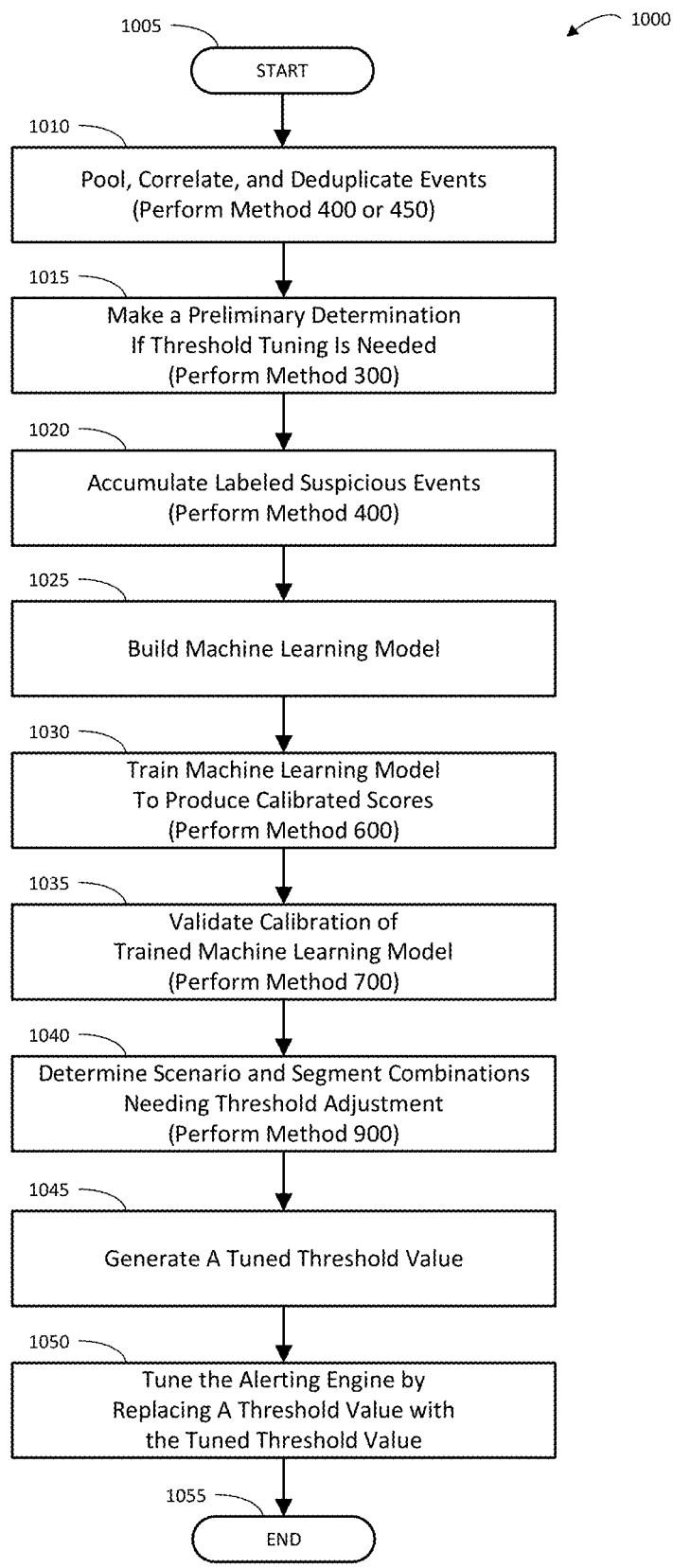
FIG. 10 illustrates another embodiment of a computer-implemented method associated with applying machine learning to below-the-line threshold tuning.

Referring now to FIG. 10, another method 1000 associated with applying machine learning to below-the-line threshold tuning is shown. Method 1000 is an embodiment unifying multiple component methods described herein in order to tune the alerting engine 105.

Processing in method 1000 begins at start block 1005 and proceeds to process block 1010. At process block 1010, processor 1210 pools, correlates, and if necessary deduplicates the events within a tuning window to form a set of historic events. In some embodiments, process block 1010 may implement method 400 or 450 as described above with reference to FIGS. 4A and 4B, and tables 1 and 2. Process block 1010 completes and processing continues at process block 1015.

At process block 1015, processor 1210 makes a preliminary determination as to whether threshold tuning is needed based on whether or not there is a suspicious event present in an initial sampling of the set of historic events. In some embodiments, process block 1015 may implement method 300 as described above with reference to FIG. 3A. Process block 1015 completes. Note that, in ongoing maintenance cycles, process block 330 of FIG. 3A. may further include a determination of whether a machine learning model has already been built or not, and a determination of whether it is a scheduled (e.g. annual) evaluation time. If a model exists, and it is not yet time for the scheduled evaluation, the process should not build a new model, and processing will continue from process block 1015 to process block 1040. Otherwise, (if no machine learning model exists, or if a machine learning model exists, but it is time for the scheduled evaluation, processing continues at process block 1020.

At process block 1020, processor 1210 accumulates labeled events in advance of building a machine learning model. To do so, processor 1210 repeats a cycle of (i) sampling events from the set of historic events and having those events investigated to determine whether they are suspicious or not, (ii) parsing the investigator's determination to regarding each sampled event to determine whether the event is suspicious or not suspicious; and (iii) applying the label of suspicious or not suspicious for each event until a minimum number of events have been labeled suspicious. In some embodiments, process block 1020 may implement method 500 as described above with reference to FIG. 5. Process block 1020 completes and processing continues at process block 1025.

At process block 1025, processor 1210 builds a cross-scenario weight-of-evidence-based logistic regression machine learning model based on the labeled events gathered in process block 1020. In some embodiments, this process may be as described above. Process block 1025 completes and processing continues at process block 1030.

At process block 1030, processor 1210 trains the machine learning model to produce calibrated scores. To train the machine learning model, processor 1210 uses the machine learning model to calculate a raw probability score for the events of a training set selected from the labeled events gathered in process block 1020. Processor 1210 creates calibrated scores by dividing the sorted resulting scores into quantiles of equal frequency and assigning the average score for the quantile as the expected score for the quantile. In some embodiments, process block 1030 may implement method 600 as described above with reference to FIG. 6. Process block 1030 completes and processing continues at process block 1035.

At process block 1035, processor 1210 validates the calibration of the trained machine learning model. To validate the calibration of the machine learning model, processor 1210 uses the machine learning model to calculate a raw probability score for the events of a validation set selected from the labeled events gathered in process block 1020. Processor 1210 validates that the expected score assigned to the quantile is calibrated by applying the divisions between quantiles of the training set to the raw scores from the validation set and determines that no expected score for a quantile underestimates the observed rate of suspicious events in the corresponding section of the validation set. In some embodiments, process block 1035 may implement method 700 as described above with reference to FIG. 7. Process block 1035 completes and, if processor 1210 determines that the model is validated, processing continues at process block 1040.

At process block 1040, processor 1210 determines which scenario and segment combinations may need threshold adjustments in order to more accurately identify suspicious events. While doing so, processor 1210 additionally determines an adjustment. In some embodiments, process block 1040 may implement method 900 as described above with reference to FIG. 9. Process block 1040 completes and processing continues at process block 1045.

At process block 1045, processor 1210 generates tuned threshold values for those scenario and segment combinations that may need threshold adjustments based on the adjustment determined by the processor 1210 at process block 1040. Processor 1210 further provides the tuned threshold values to tuning component 120, for example in real-time, on an event-by-event basis, or in a batch. This process may be as described above, for example with reference to process block 240 of FIG. 2. Process block 1045 completes and processing continues at process block 1050.

At process block 1050, processor 1210 tunes the alerting engine 105 by replacing a threshold value in rules component 125 with the tuned threshold value generated at process block 1045. This tuning adjusts threshold line 130 improving the accuracy of alerting engine 105 in determining whether or not an event is suspicious. Processor 1210 causes tuning component 120 to replace the threshold value with the tuned threshold value in the rules component 125 for example in real-time, on an event-by-event basis, or in a batch. This process may be as described above, for example with reference to process block 245 of FIG. 2. Process block 1050 pleats and processing continues to end block 1055 where process 1000 ends.

—Cloud or Enterprise Embodiments—

In one embodiment, monitoring system 100 is a computing/data processing system including an application or collection of distributed applications for enterprise organizations. The applications and computing system 100 may be configured to operate with or be implemented as a cloud-based networking system, a software as a service (SaaS) architecture, or other type of networked computing solution. In one embodiment system 100 is a centralized server-side application that provides at least the functions disclosed herein and that is accessed by many users via computing devices/terminals communicating with the computing system 100 (functioning as the server) over a computer network.

—Non-Transitory Computer-Readable Medium Embodiments—

Figure 11:
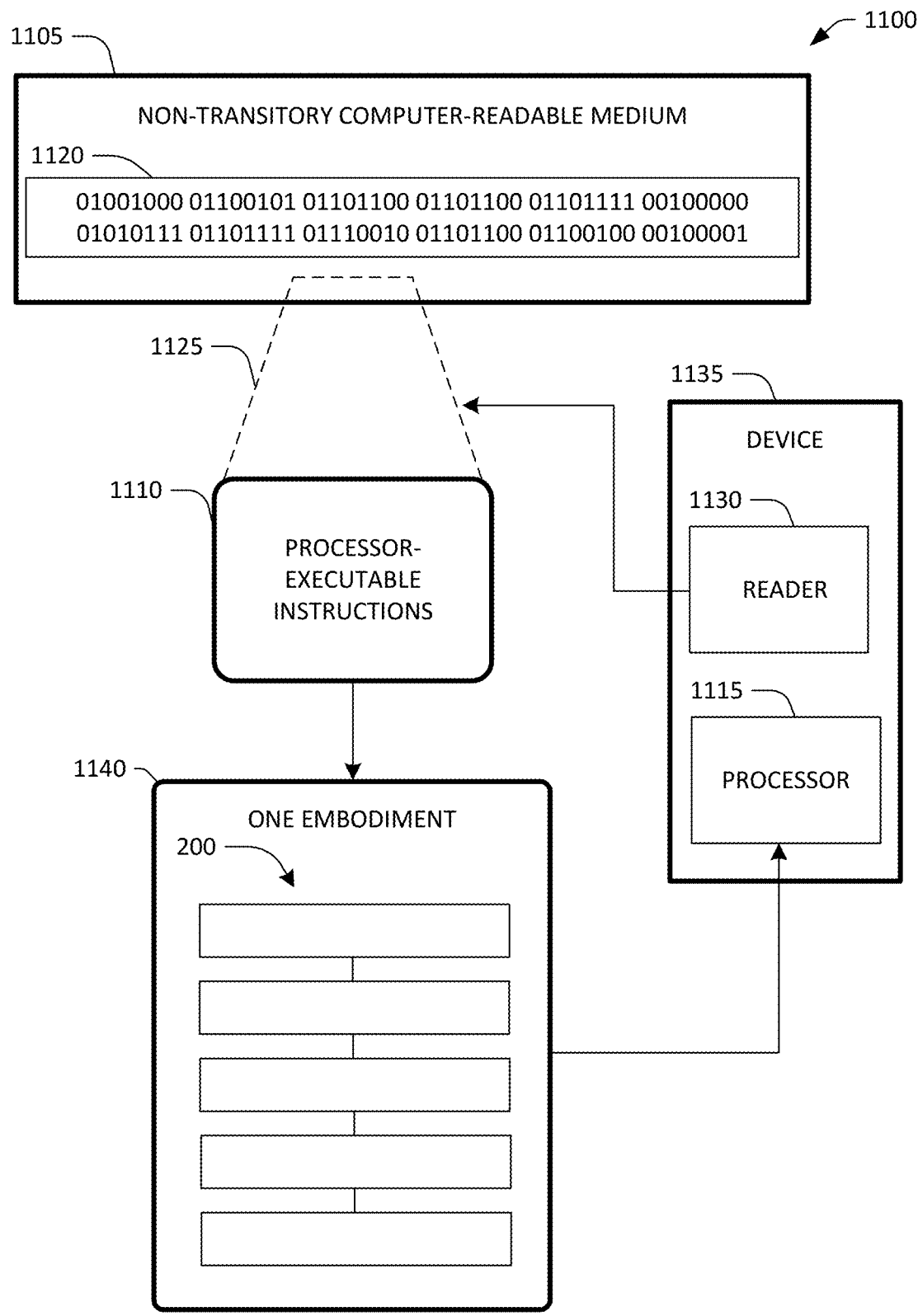
FIG. 11 illustrates an embodiment of a non-transitory computer-readable medium configured with instructions for performing one embodiment of the method disclosed.

FIG. 11 shows a scenario 1100 involving an example non-transitory computer-readable medium 1105. In one embodiment, one or more of the components described herein are configured as program modules, such as those of monitoring system 100 associated with applying machine learning to below-the-line threshold tuning, stored in the non-transitory computer-readable medium 1105. The program modules are configured with stored instructions, such as processor-executable instructions 1110, that when executed by at least a processor, such as processor 1115, cause the computing device to perform the corresponding function(s) as described herein. For example, functionality of the monitoring system 100 associated with applying machine learning to below-the-line threshold tuning, stored in the non-transitory computer-readable medium 1105, may be executed by the processor 1115 as the processor-executable instructions 1110 to perform an embodiment 1140 of the method 200 of FIG. 2 or other methods described herein.

The non-transitory computer-readable medium 1105 includes the processor-executable instructions 1110 that when executed by a processor 1115 cause performance of at least some of the provisions herein. The non-transitory machine readable medium 1105 includes a memory semiconductor (such as, for example, a semiconductor utilizing static random-access memory (SRAM), dynamic random-access memory (DRAM), and/or synchronous dynamic random-access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 1105 stores computer-readable data 1120 that, when subjected to reading 1125 by a reader 1130 of a device 1135 (e.g., a read head of a hard disk drive, or a read operation invoked on a solid-state storage device), express the processor-executable instructions 1110. In some embodiments, the processor-executable instructions 1110, when executed cause performance of operations, such as at least some of the method 200 of FIG. 2, for example. In some embodiments, the processor-executable instructions 1110 are configured to cause implementation of a system, such as at least some of the system 100 of FIG. 1, for example.

—Computing Device Embodiment—

Figure 12:
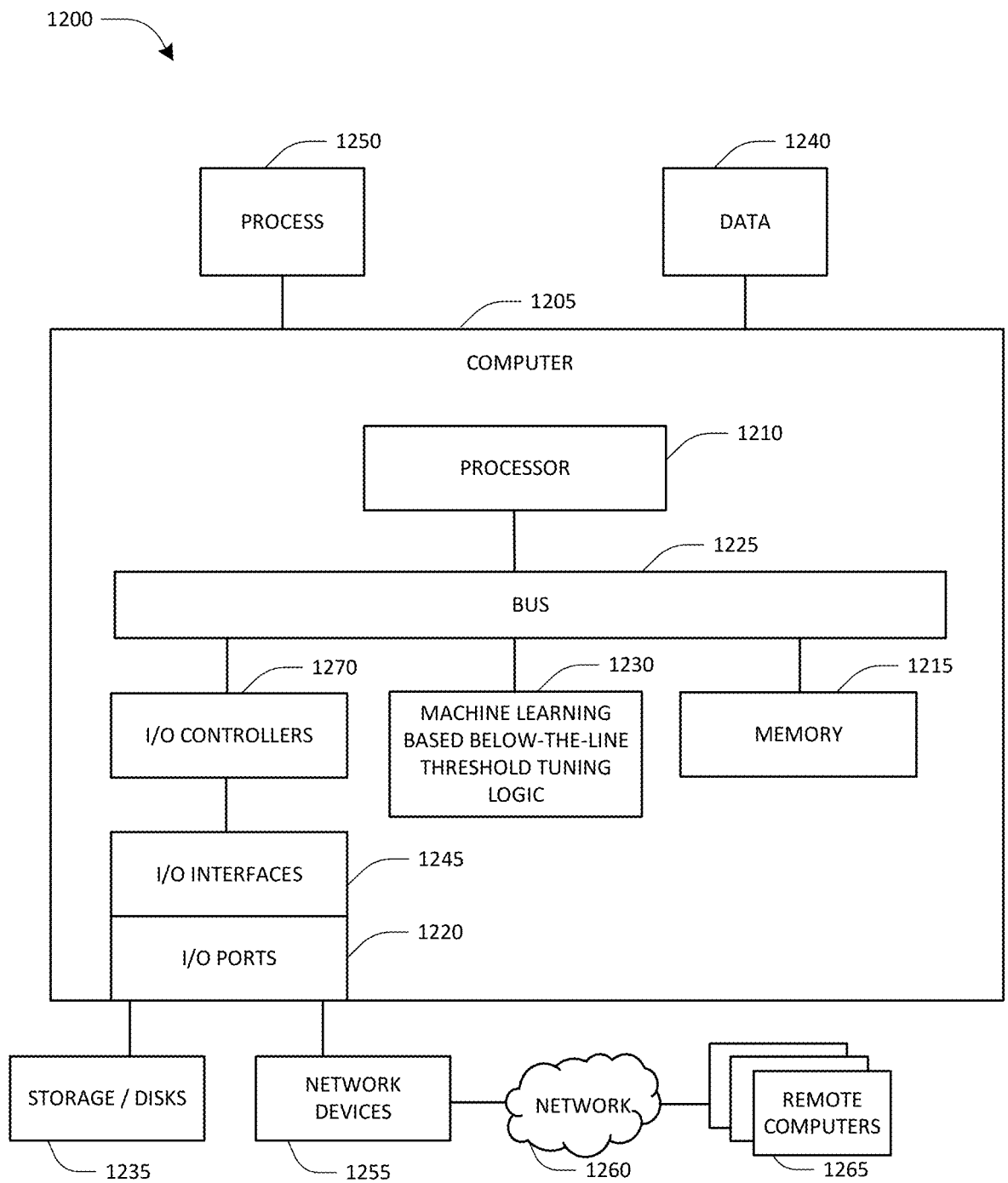
FIG. 12 illustrates an embodiment of a computing system configured with the example systems and/or methods disclosed.

FIG. 12 illustrates an example computing device 1200 that is specially configured and/or programmed with one or more of the example systems and methods described herein, and/or equivalents. The example computing device may be a computer 1205 that includes a hardware processor 1210, a memory 1215, and input/output ports 1220 operably connected by a bus 1225. In one example, the computer 1205 includes Machine Learning Based Below-the-Line Threshold Tuning logic 1230 configured to facilitate performance of operations, such as at least some of the method 200 of FIG. 2 or to cause implementation of a system, such as at least some of the system 100 of FIG. 1, or other methods or systems described herein. In different examples, the logic 1230 may be implemented in hardware, a non-transitory computer-readable medium 1105 with stored instructions, firmware, and/or combinations thereof. While the logic 1230 is illustrated as a hardware component attached to the bus 1225, it is to be appreciated that in other embodiments, the logic 1230 could be implemented in the processor 1210, stored in memory 1215, or stored in disk 1235.

In one embodiment, logic 1230 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to implement Machine Learning Based Below the Line Threshold Tuning. The means may also be implemented as stored computer executable instructions that are presented to computer 1205 as data 1240 that are temporarily stored in memory 1215 and then executed by processor 1210.

Logic 1230 may also provide means (e.g., hardware, non-transitory computer-readable medium that stores executable instructions, firmware) for performing Machine Learning Based Below the Line Threshold Tuning.

Generally describing an example configuration of the computer 1205, the processor 1225 may be a variety of various hardware processors including dual microprocessor and other multi-processor architectures. A memory 1215 may include volatile memory and/or non-volatile memory. Non-volatile memory may include, for example, ROM, PROM, EPROM, EEPROM and so on. Volatile memory may include, for example, RAM, SRAM, DRAM, and so on.

Storage 1235 may be operably connected to the computer 1205 via, for example, an input/output (I/O) interface (e.g., card, device) 1245 and an input/output port 1220 that are controlled by at least an input/output (I/O) controller 1270. The storage 1235 may be, for example, one or more of a magnetic disk drive, a solid state disk drive, a floppy disk drive, a tape drive, a Zip drive, a flash memory card, a memory stick, or other non-transitory computer-readable media. Furthermore, the storage 1235 may be a CD-ROM drive, a CD-R drive, a CD-RW drive, a DVD ROM, and so on. The memory 1215 can store a process 1250 and/or a data 1240, for example. The disk storage 1235 and/or the memory 1215 can store an operating system that controls and allocates resources of the computer 1205.

The computer 1205 may interact with input/output (I/O) devices via the input/output (I/O) controller 1270, the I/O interfaces 1245 and the input/output ports 1220. Input/output devices may be, for example, a keyboard, a microphone, a pointing and selection device, cameras, video cards, displays, the storage 1235, the network devices 1255, and so on. The input/output ports 1220 may include, for example, serial ports, parallel ports, and USB ports.

The computer 1205 can operate in a network environment and thus may be connected to the network devices 1255 via the I/O interfaces 1245, and/or the I/O ports 1220. Through the network devices 1255, the computer 1205 may interact with a network 1260. Through the network 1260, the computer 1205 may be logically connected to remote computers 1265. Networks with which the computer 1205 may interact include, but are not limited to, a LAN, a WAN, and other wired and/or wireless networks. The computer 1205 may manage data communications to and from the I/O interfaces with I/O controllers 1270.

The computer 1205 may exchange electronic messages with the remote computers over the network. Such electronic messages may be provided as emails, short message service (SMS) messages or other types of message using Transmission Control Protocol (TCP)/Internet Protocol (IP) or other communication protocols.

—Definitions and Other Embodiments—

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks.

Further, where a series of blocks in a figure expresses a loop, an embodiment in a post-test or "do . . . while" loop could, in other embodiments, be implemented as a pre-test or "while" loop, and vice versa.

The systems and methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
LAN: local area network.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
USB: universal serial bus.
WAN: wide area network.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that when executed by at least a processor of a computer cause the computer to:
   train, by at least the processor, a machine learning model to predict probabilities that an event is fraudulent on a set of events (i) sampled from a set of historic events labeled by an alerting engine as either above-the-line events or below-the-line events on either side of a threshold line indicating that an event is suspicious, and (ii) confirmed to be either fraudulent or not fraudulent;
   determine, by at least the processor, that the alerting engine should be tuned based on differences between probability values predicted for the events in the set of historic events by the trained machine learning model and the labels applied to the events in the set of historic events as being either the above-the-line events or the below-the-line events;
   generate, by at least the processor, a tuned threshold value for the threshold line based at least in part on the probability values predicted by the machine learning model; and
   tune, by at least the processor, the alerting engine by replacing a threshold value with the tuned threshold value to adjust the threshold line to more accurately label subsequent events as not suspicious.

2. The non-transitory computer-readable medium of claim 1, further comprising instructions that when executed by at least the processor cause the computer to:
   pool events detected in the activity of a focal entity by scenario and segment combination applied to the focal entity; and
   correlate the pooled events of the focal entity with other pooled events detected by other scenario and segment combinations applied to the focal entity.

3. The non-transitory computer-readable medium of claim 2, further comprising instructions that when executed by at least the processor cause the computer to identify a time period for which the pooled, correlated events are correlated.

4. The non-transitory computer-readable medium of claim 2, further comprising instructions that when executed by at least the processor cause the computer to deduplicate the set of sampled events such that each correlated event is unique based on a primary key.

5. The non-transitory computer-readable medium of claim 2, further comprising instructions that when executed by at least the processor cause the computer to label all the pooled, correlated events of the focal entity suspicious where any one of the pooled, correlated events of the focal entity is confirmed to be suspicious.

6. The non-transitory computer-readable medium of claim 1, further comprising instructions that that when executed by at least the processor cause the computer to determine that a rate of suspicious events estimated by the machine learning model in a sector of the set of events exceeds a preset tolerable rate of suspicious events for the sector, indicating that alerting engine thresholds for the sector should be tuned.

7. The non-transitory computer-readable medium of claim 1, further comprising instructions that that when executed by at least the processor cause the computer to automatically generate the tuned threshold value by selecting to be the tuned threshold value a parameter value of an event predicted to be suspicious by the machine learning model that is beyond the threshold value.

8. A computer-implemented method, comprising:
training a machine learning model to predict probabilities that an event is fraudulent on a set of events (i) sampled from a set of historic events labeled by an alerting engine as either above-the-line events or below-the-line events on either side of a threshold line indicating that an event is suspicious, and (ii) confirmed to be either fraudulent or not fraudulent;
determining that the alerting engine should be tuned based on differences between probability values predicted for the events in the set of historic events by the trained machine learning model and the above-the-line labels or below-the-line labels applied to the events in the set of historic events;
generating a tuned threshold value for the threshold line based at least in part on the probability values predicted by the machine learning model; and
tuning the alerting engine by replacing a threshold value with the tuned threshold value to adjust the threshold line to more accurately label subsequent events as not suspicious.

9. The computer-implemented method of claim 8, further comprising:
pooling events detected in the activity of a focal entity by scenario and segment combination applied to the focal entity; and
correlating the pooled events of the focal entity with other pooled events detected by other scenario and segment combinations applied to the focal entity.

10. The computer-implemented method of claim 9, further comprising identifying a time period for which the pooled, correlated events are correlated.

11. The computer-implemented method of claim 9, further comprising deduplicating the set of sampled events such that each correlated event is unique based on a primary key.

12. The computer-implemented method of claim 9, further comprising labeling all the pooled, correlated events of the focal entity suspicious where any one of the pooled, correlated events of the focal entity is confirmed to be suspicious.

13. The computer-implemented method of claim 8, further comprising determining that a rate of suspicious events estimated by the machine learning model in a sector of the set of events exceeds a preset tolerable rate of suspicious events for the sector, indicating that alerting engine thresholds for the sector should be tuned.

14. The computer-implemented method of claim 8, further comprising automatically generating the tuned threshold value by selecting to be the tuned threshold value a percentile threshold value of a next percentile band that brackets a parameter value of an event predicted to be suspicious by the machine learning model that is beyond the threshold value.

15. A computing system, comprising:
a memory for storing at least instructions;
a processor configured to at least execute the instructions from the memory;
a non-transitory computer-readable medium operably connected to the processor and storing computer-executable instructions that when executed by at least a processor cause the computing system to:
train, by at least the processor, a machine learning model to predict probabilities that an event is fraudulent on a set of events (i) sampled from a set of historic events labeled by an alerting engine as either above-the-line events or below-the-line events on either side of a threshold line indicating that an event is suspicious, and (ii) confirmed to be either fraudulent or not fraudulent;
determine, by at least the processor, that the alerting engine should be tuned based on differences between probability values predicted for the events in the set of historic events by the trained machine learning model and the labels applied to the events in the set of historic events as either the above-the-line events or the below-the-line events;
generate, by at least the processor, a tuned threshold value for the threshold line based at least in part on the probability values predicted by the machine learning model; and
tune, by at least the processor, the alerting engine by replacing a threshold value with the tuned threshold value to adjust the threshold line to more accurately label subsequent events as not suspicious.

16. The computing system of claim 15, wherein the computer-executable instructions that when executed by at least the processor further cause the computing system to:
pool events detected in the activity of a focal entity by scenario and segment combination applied to the focal entity; and
correlate the pooled events of the focal entity with other pooled events detected by other scenario and segment combinations applied to the focal entity.

17. The computing system of claim 16, wherein the computer-executable instructions that when executed by at least the processor further cause the computing system to identify a time period for which the pooled, correlated events are correlated.

18. The computing system of claim 16, wherein the computer-executable instructions that when executed by at least the processor further cause the computing system to label all the pooled, correlated events of the focal entity are suspicious where any one of the pooled, correlated events of the focal entity is confirmed to be suspicious.

19. The computing system of claim 15, wherein the computer-executable instructions that when executed by at least the processor further cause the computing system to determine that a rate of suspicious events estimated by the machine learning model in a sector of the set of events exceeds a preset tolerable rate of suspicious events for the sector, indicating that alerting engine thresholds for the sector should be tuned.

20. The computing system of claim 15, wherein the computer-executable instructions that when executed by at least the processor further cause the computing system to automatically generate the tuned threshold value by selecting to be the tuned threshold value a parameter value of an event predicted to be suspicious by the machine learning model that is beyond the threshold value.

* * * * *